US011480796B2

(12) United States Patent
Liu et al.

(10) Patent No.: US 11,480,796 B2
(45) Date of Patent: Oct. 25, 2022

(54) THREE-DIMENSIONAL DISPLAY MODULE USING OPTICAL WAVE-GUIDE FOR PROVIDING DIRECTIONAL BACKLIGHTS

(71) Applicant: SUN YAT-SEN UNIVERSITY, Guangdong (CN)

(72) Inventors: Lilin Liu, Guangdong (CN); Dongdong Teng, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 99 days.

(21) Appl. No.: 17/149,765

(22) Filed: Jan. 15, 2021

(65) Prior Publication Data
US 2021/0223462 A1 Jul. 22, 2021

(30) Foreign Application Priority Data
Jan. 16, 2020 (CN) .......................... 202010049003.X

(51) Int. Cl.
*G02B 27/00* (2006.01)
*G02B 27/01* (2006.01)
*G02B 27/10* (2006.01)

(52) U.S. Cl.
CPC ..... *G02B 27/0172* (2013.01); *G02B 27/1006* (2013.01); *G02B 2027/0134* (2013.01); *G02B 2027/0178* (2013.01)

(58) Field of Classification Search
CPC ............ G02B 27/0172; G02B 27/1006; G02B 2027/0134; G02B 2027/0178; G02B 6/0011
See application file for complete search history.

(56) References Cited

U.S. PATENT DOCUMENTS

2009/0040426 A1\* 2/2009 Mather ................. G02F 1/1335
349/65
2013/0321913 A1\* 12/2013 Harrold .................. G02B 30/24
359/464

(Continued)

FOREIGN PATENT DOCUMENTS

| WO | 2017186020 | 11/2017 |
| WO | 2018091984 | 5/2018 |
| WO | 2019137272 | 7/2019 |

OTHER PUBLICATIONS

Hwang, Y. S., Bruder, F. K., Fäcke, T., Kim, S. C., Walze, G., Hagen, R., & Kim, E. S. (2014). Time-sequential autostereoscopic 3-D display with a novel directional backlight system based on volume-holographic optical elements. Optics Express, 22(8), 9820-9838.\*

(Continued)

*Primary Examiner* — Sarah Lhymn
(74) *Attorney, Agent, or Firm* — JCIPRNET

(57) ABSTRACT

The invention discloses a three-dimensional display module using optical wave-guide for providing directional backlights. This display module includes a wave-guide backlight unit with time-sequential directional light sources, a display device, a wavefront modulation device or a light splitting device, and other components. The wave-guide backlight unit with time-sequential directional light sources includes a sequential-switching light-source array, a relay device, and an optical wave-guide device. Each light source of the sequential-switching light-source array provides backlight of corresponding vector characteristics to the display device, making optical message displayed by the display device being guided to the corresponding viewing zone/viewing zones. Through the technology routes of multiple-view-for-one-pupil or/and Maxwellian view, the three-dimensional display module implements displays free from the vergence-accommodation conflict. The introduction of the optical (Continued)

wave-guide device results in a thin structure, and the disclosed display module can be applied to various display terminals, such as mobile phones, iPads, head-mounted VR/AR, etc.

24 Claims, 22 Drawing Sheets

(56) References Cited

U.S. PATENT DOCUMENTS

| | | | |
|---|---|---|---|
| 2014/0240828 A1* | 8/2014 | Robinson | G02B 6/0048 362/613 |
| 2015/0160404 A1* | 6/2015 | Robinson | G02B 6/0048 359/464 |
| 2015/0268479 A1* | 9/2015 | Woodgate | G02B 6/0035 359/462 |
| 2016/0195720 A1* | 7/2016 | Travis | G03H 1/2205 359/19 |
| 2017/0255013 A1* | 9/2017 | Tam | G02B 27/0176 |
| 2017/0336661 A1* | 11/2017 | Harrold | G02F 1/13318 |
| 2017/0339398 A1* | 11/2017 | Woodgate | G02B 30/24 |
| 2018/0196275 A1* | 7/2018 | Robinson | G02B 6/0068 |
| 2018/0284341 A1* | 10/2018 | Woodgate | G02B 6/0048 |
| 2019/0204600 A1 | 7/2019 | Ha et al. | |
| 2020/0225402 A1* | 7/2020 | Ihas | G02B 6/0046 |
| 2021/0174765 A1* | 6/2021 | Woodgate | G02B 6/0066 |

OTHER PUBLICATIONS

Woodgate, G. J., Robinson, M. G., Sommerlade, E., Harrold, J., Ihas, B., & Ramsey, R. (Jun. 2015). P-162L: Late-News Poster: Intelligent Backlight Technology Developments for Uniformity, Privacy & 3D Operation. In SID Symposium Digest of Technical Papers (vol. 46, No. 1, pp. 1448-1451).*

* cited by examiner

THREE-DIMENSIONAL DISPLAY MODULE USING OPTICAL WAVE-GUIDE FOR PROVIDING DIRECTIONAL BACKLIGHTS

CROSS-REFERENCE TO RELATED APPLICATION

This application claims the priority benefit of China application serial no. 202010049003.X, filed on Jan. 16, 2020. The entirety of the above-mentioned patent application is hereby incorporated by reference herein and made a part of this specification.

BACKGROUND

Technical Field

The present invention relates to the field of three-dimensional display technology, and more particularly to a three-dimensional display module using optical wave-guide for providing directional backlights.

Description of Related Art

Compared with traditional two-dimensional displays, three-dimensional displays are able to present the depth information. Most existing 3D displays are based on stereoscopic technology, which present depth information per binocular parallax through projecting one corresponding perspective view to each eye of the viewer. In this process, the intersection of two eyes' visual directions triggers the viewer's sense of depth. But in order to see the corresponding perspective view clearly, each eye of the viewer has to focus on the display plane. Thus, an inconsistency between the binocular convergence depth and the monocular accommodation depth exits in the stereoscopic technology, which is often called the vergence-accommodation conflict (VAC). Under natural circumstances, when the viewer observes a real three-dimensional scene, the binocular convergence depth and the monocular accommodation depth are consistent. Thus, the vergence-accommodation conflict of the stereoscopic technology violates the human physiological habits and results in visual discomfort to the viewer. Actually, vergence-accommodation conflict is the bottleneck problem that hinders the wide applications of 3D display technology.

At present, researchers are trying to develop different technologies for alleviating or eventually overcoming this bottleneck problem. Among them, the Maxwellian view (US2019/0204600, AUGMENTED REALITY OPTICS SYSTEM WITH PINPOINT MIRROR) and the multiple-view-for-one-pupil (PCT/CN2017/080874, THREE-DIMENSIONAL DISPLAY SYSTEM BASED ON DIVISION MULTIPLEXING OF VIEWER'S ENTRANCE-PUPIL AND DISPLAY METHOD) are two feasible technologies. In the Maxwellian view technology, the light beam from each pixel has a small light-intensity gradient along the propagation direction for enhancing the attractiveness of the out-of-the-display-plane light spot to the viewer's focus. Then, driven by the binocular convergence, the eyes can focus at the binocular convergence depth within a certain depth range naturally. The latter technology projects two or more views to different segments of the viewer's pupil. For a displayed spot, the two or more passing-through light beams from the two or more views along different directions superimpose into a spatial light spot. When the light intensity distribution at this spatial light spot enables stronger attraction to the eye's focus than that of the pixels on the display plane, the viewer's eye will focus on the superimposing spot naturally.

SUMMARY

The present invention proposes a three-dimensional display module using optical wave-guide to provide directional backlights, which can be directly used as a binocular three-dimensional display system for presenting focusable three-dimensional scenes to the viewer's two eyes, or as an eyepiece for presenting focusable three-dimensional scenes to one eye of the viewer, with two such eyepieces for the viewer's two eyes, respectively. This display module is composed of a wave-guide backlight unit with time-sequential directional light sources, a display device, a wavefront modulation device or a light splitting device, and other components. The wave-guide backlight unit with time-sequential directional light sources includes a sequential-switching light-source array, a relay device, and an optical wave-guide device. Each light source of the sequential-switching light-source array provides backlight with corresponding vector characteristics to the display device, with optical message displayed by the display device being guided to corresponding viewing zone/viewing zones. Through the technical routes of multiple-view-for-one-pupil or/and Maxwellian view, the display module implements three-dimensional displays free from the vergence-accommodation conflict. The introduction of the optical wave-guide device results in thin structure, and the disclosed display module can be applied to various display terminals, such as mobile phones, iPads, head-mounted VR/AR, etc.

In order to overcome the vergence-accommodation conflict based on technology routes of the Maxwellian view or/and multiple-view-for-one-pupil, a thin and slight backlight structure is designed for providing directional backlights to the display device. The present invention provides the following solutions:

A three-dimensional display module using optical wave-guide for providing directional backlights, comprising: a wave-guide backlight unit with time-sequential directional light sources, which comprises a sequential-switching light-source array composed of M light sources, a relay device for modulating a light from each light source, and an optical wave-guide device for guiding lights from the relay device where M≥2, wherein the wave-guide backlight unit with time-sequential directional light sources is arranged such that the M light sources get turned-on sequentially at the M time-points of each time period, and the light emitted from each light source provides a backlight of corresponding vector characteristics; a display device composed of pixels, which takes the lights from the wave-guide backlight unit with time-sequential directional light sources as backlights and each pixel of the display device modulates an incident light beam from the wave-guide backlight unit with time-sequential directional light sources for loading optical image at each time-point; a wavefront modulation device placed in front of or behind the display device along the propagation directions of the lights from the wave-guide backlight unit with time-sequential directional light sources, which converges the light from each light source to a corresponding viewing zone; a control device, which sequentially turns on the M light sources at M time-points of each time period with only one light source being turned-on at each time-point, and loads optical information onto each pixel of the display device synchronously, with the loaded optical information of a pixel at a time-point being a projection information of a target scene along a reverse direction of a projection direction corresponding this pixel; wherein the projection direction corresponding to a pixel at a time-point is a propagation direction of a light beam from this pixel when it enters into the corresponding viewing zone at this time-point, and the three-dimensional display module using optical wave-guide for providing directional backlights is arranged such that totally M different viewing zones get presented.

Furthermore, the wavefront modulation device is integrated into the optical wave-guide device.

Furthermore, the optical wave-guide device is comprised of an optical wave-guide body, an entrance pupil, a coupling-in device, reflecting surfaces, a coupling-out device and an exit pupil; wherein, the light from each light source enters the optical wave-guide body through the relay device and the entrance pupil; then, guided by the coupling-in device and reflected by the reflecting surfaces, the light from each light source propagates in the optical wave-guide body toward the coupling-out device; the coupling-out device guides the light from each light source to exit the optical wave-guide body through the exit pupil with corresponding vector characteristics.

Furthermore, the M light sources of the wave-guide backlight unit with time-sequential directional light sources are line light sources; the three-dimensional display module using optical wave-guide for providing directional backlights is arranged such that, for each displayed point, at least two passing-through light beams reach into a pupil positioned around the viewing zones.

Furthermore, the M light sources of the wave-guide backlight unit with time-sequential directional light sources are point light sources; the three-dimensional display module using optical wave-guide for providing directional backlights is arranged such that, for each displayed point, at least one passing-through light beam reaches into a pupil positioned around the viewing zones.

Furthermore, a scattering element is attached to the display device for scattering the light beam modulated by a pixel along a one-dimensional direction; the three-dimensional display module is arranged such that, for each displayed point, at least two passing-through light beams reach into a pupil positioned around the viewing zones.

Furthermore, the three-dimensional display module using optical wave-guide for providing directional backlights further comprises a deflection device placed in a propagation path of a light from the wave-guide backlight unit with time-sequential directional light sources for deflecting its propagation direction.

Furthermore, the three-dimensional display module using optical wave-guide for providing directional backlights further comprises a compensation unit placed between an external environment and the wavefront modulation device, for eliminating the impact of the wavefront modulation device on optical information from the external environment.

Furthermore, the wavefront modulation device is a lens. Specifically, the wavefront modulation device may be a cylindrical lens.

Furthermore, the wavefront modulation device is a zoom lens with controllable focus; wherein, the control device is arranged to drive the wavefront modulation device for projecting multiple virtual images of the display device to different depths in a time sequence, and load corresponding information to each pixel of the display device synchronously; or, according to a viewer's binocular convergence depth detected by an external auxiliary device, the control device is arranged to drive the wavefront modulation device for real-timely projecting the virtual image of the display device to the viewer's binocular convergence depth or a depth near it, and synchronously load corresponding information to each pixel of the display device.

Furthermore, the wavefront modulation device is a liquid crystal lens with changeable focal length under the driving of the control device, or a compound liquid crystal lens stacked by more than one liquid crystal plates; wherein, the compound liquid crystal lens presents different focal lengths through the combination of different liquid crystal plates.

Furthermore, the three-dimensional display module using optical wave-guide for providing directional backlights further comprises a light-path-folding structure inserted in the propagation path of the light from the wave-guide backlight unit with time-sequential directional light sources.

Furthermore, the light-path-folding structure comprises a first modulation plate, a semi-reflective and semi-transparent plate, a second modulation plate, a selective-reflection/transmission device, wherein the selective-reflection/transmission device reflects a light with one kind of characteristics and transmits a light with another kind of characteristics, which are named as reflection characteristics and transmission characteristics respectively, and the second modulation plate modulates the light of reflection characteristics into the light of transmission characteristics when the light passes through twice; the light-path-folding structure is arranged such that: propagating through the first modulation plate and the second modulation plate, the incident light with reflection characteristics is reflected by the selective-reflection/transmission device; then the reflected light passes through the second modulation plate once more and is reflected by the semi-reflective and semi-transparent plate; the reflected light from the semi-reflective and semi-transparent plate passes through the second modulation plate thirdly and changes into light of transmission characteristics to exit the selective-reflection/transmission device.

Furthermore, the three-dimensional display module using optical wave-guide for providing directional backlights further comprises a pupil positioning unit for real-timely determining a spatial position of a pupil or spatial positions of the pupils, then according to the real-time spatial position of the pupil or the real-time spatial positions of the pupils, only N light sources of the M light sources whose emitting light beams reach into the pupil or the pupils are activated at N time-points of each time period for display, where M≥N≥2.

The present invention further provides another solution as follow:

A three-dimensional display module using optical wave-guide for providing directional backlights, comprising: a wave-guide backlight unit with time-sequential directional light sources, which comprises a sequential-switching light-source array composed of M light sources, a relay device for modulating a light from each light source, and an optical wave-guide device for guiding the lights from the relay device, where M≥2, wherein the wave-guide backlight unit with time-sequential directional light sources is arranged such that the M light sources get turned-on sequentially at the M time-points of each time period, and the light emitted from each light source provides a parallel backlight along at least a one-dimensional direction passing through the relay device and the optical wave-guide device; a display device composed of pixels, which takes the lights from the wave-guide backlight unit with time-sequential directional light sources as the backlights, and each pixel of the display device modulates an incident light beam for loading optical image at each time-point; a light splitting device placed in front of or behind the display device, which guides light beams modulated or to be modulated by different groups of pixels on the display device to different viewing zones at each time-point, respectively; a control device, which sequentially turns on the M light sources at M time-points of each time period with only one light source being turned-on at each time-point, and synchronously loads optical information onto each pixel of the display device, with the loaded optical information of a pixel at a time-point being a projection information of a target scene along a reverse direction of a projection direction corresponding this pixel; wherein the projection direction corresponding to a pixel at a time-point is the propagation direction of a light beam from this pixel when it enters into the corresponding viewing zone at this time-point, the three-dimensional display module using optical wave-guide for providing directional backlights is arranged such that light beams modulated by a same pixel of the display device propagate along different directions at different time-points of each time period.

Furthermore, the optical wave-guide device comprises an optical wave-guide body, an entrance pupil, a coupling-in device, reflecting surfaces, a coupling-out device and an exit pupil; wherein, the light from each light source enters the optical wave-guide body through the relay device and the entrance pupil; then, guided by the coupling-in device and reflected by the reflecting surfaces, the light from each light source propagates in the optical wave-guide body toward the coupling-out device; the coupling-out device guides the light from each light source to exit the optical wave-guide body through the exit pupil with the corresponding vector characteristics.

Furthermore, the M light sources of a wave-guide backlight unit with time-sequential directional light sources are line light sources; the three-dimensional display module is arranged such that, for each displayed point, at least two passing-through light beams reach into a pupil positioned around the viewing zones.

Furthermore, the M light sources of a wave-guide backlight unit with time-sequential directional light sources are point light sources; the three-dimensional display module is arranged such that, for each displayed point, at least one passing-through light beam reaches into a pupil positioned around the viewing zones.

Furthermore, a unidirectional converging device is placed in front of or behind the display device to converge the light along a one-dimensional converging direction; the light splitting device is constructed by strip-shaped periodic elements with the long direction of the strip-shaped elements being consistent with the converging direction of the unidirectional converging device.

Furthermore, a scattering element is attached to the display device; the light splitting device is constructed by strip-shaped periodic elements arranged along one direction, and the scattering element scatters the light beam modulated by the pixel along the long direction of the strip-shaped periodic elements; the three-dimensional display module is arranged such that, for each displayed point, at least two passing-through light beams reach into a pupil positioned around the viewing zones.

Furthermore, the three-dimensional display module using optical wave-guide for providing directional backlights further comprises a projection device for projecting the virtual image of the display device.

Furthermore, the three-dimensional display module using optical wave-guide for providing directional backlights further comprises a pupil positioning unit for real-timely determining a spatial position of a pupil or the spatial positions of the pupils, then according to the real-time spatial position of the pupil or the real-time spatial positions of the pupils, only N light sources of the M light sources whose emitting light beams reach into the pupil or the pupils are activated at N time-points of each time period for the display, where M≥N≥2.

Furthermore, two or more wave-guide backlight unit with time-sequential directional light sources are designed for providing backlights to different segments of the display device.

Through designing the vector characteristics of the backlights from the point light sources, the propagation direction of the light modulated by a pixel gets controllable. Thus, through sequentially guiding two or more passing-through light beams of a displayed point to a pupil along different directions, multiple-view-for-one-pupil technology is implemented for three dimensional display free of the vergence-accommodation conflict, as described in the published PCT WO2018/091984 A1 (NEAR-EYE SEQUENTIAL LIGHT-FIELD PROJECTOR WITH CORRECT MONOCULAR DEPTH CUES). However, the backlights from the point light sources need a propagation distance to cover the whole display device, which requires a thick optical structure as described in the published PCT WO2018/091984 A1, which is unfavorable for its practical application.

The present invention proposes using light wave-guide structure to provide backlights with different vector characteristics to the display device. Three dimensional display with natural focusing gets implemented based on Maxwellian view or/and multiple-view-for-one-pupil technologies. Light splitting device is further introduced in for presenting more viewing zones.

The present invention has the following technical effects: 1) Optical wave-guide is designed for guiding directional backlights to the display device, which results in a thin display module being applicable to various screens and portable display terminals, such as head-mounted VR, AR, mobile phones, iPads, etc. 2) The vector characteristics of the backlights also activate the Maxwellian view or/and multiple-view-for-one-pupil display mechanisms for natural three-dimensional display with consistent binocular convergence depth and monocular accommodation depth.

The details of the embodiments of the present invention are reflected in the drawings or/and the following description. Other characteristics, objects and advantages of the present invention will become more apparent through the following description and the accompanying drawings.

BRIEF DESCRIPTION OF THE DRAWINGS

The drawings are used for better understanding the present invention and are also part of this specification. The drawings and descriptions illustrating the embodiments are used together to explain the principle of the present invention.

DESCRIPTION OF THE EMBODIMENTS

In the present invention, the proposed three-dimensional display module using optical wave-guide for providing directional backlights enables a display device projecting more than one perspective views to corresponding viewing zones, respectively. Based on the display mechanisms of multiple-view-for-one-pupil or/and Maxwellian view technologies, the viewer's eyes can focus on the displayed spatial spots naturally. Compared with those existing three-dimensional display modules with directional backlights, the present invention is characterized in a lighter and thinner structure by introducing optical wave-guide to provide backlights. The three-dimensional display module using optical wave-guide for providing directional backlights is often abbreviated as the "the three-dimensional display module" or "a three-dimensional display module" in the following segments.

Figure 1:
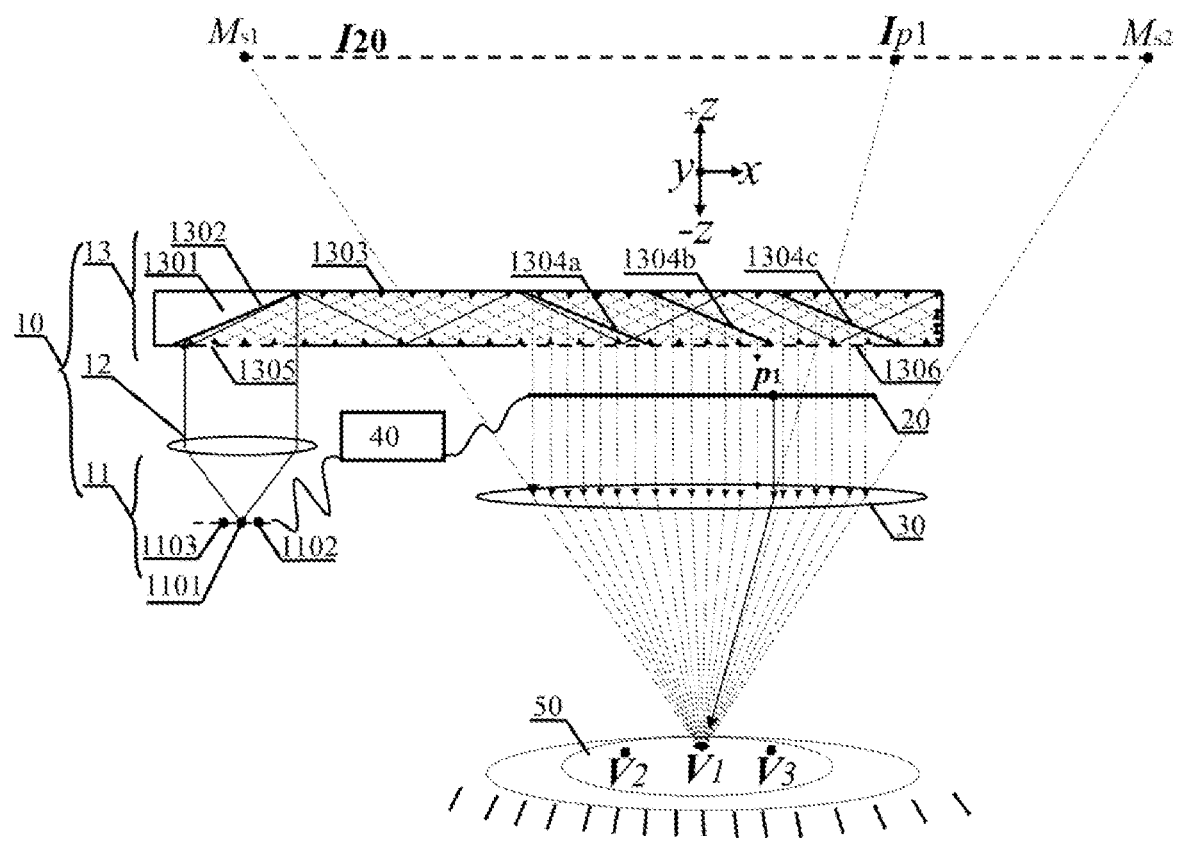
FIG. 1 is an optical structure of a three-dimensional display module with a wavefront modulation device.

FIG. 1 shows the structure of a three-dimensional display module using optical wave-guide for providing directional backlights. It includes a wave-guide backlight unit with time-sequential directional light sources 10, a display device 20, a wavefront modulation device 30, and a control device 40. Among them, the wave-guide backlight unit with time-sequential directional light sources 10 comprises a relay device 12 for modulating the light from each light source, an optical wave-guide device 13 for guiding the light from the relay device 12, and a sequential-switching light-source array 11 which includes M≥2 light sources. FIG. 1 takes M=3 as an example. M=3 light sources 1101, 1102, and 1103 of the sequential-switching light-source array 11 are turned on and off sequentially at adjacent M=3 time-points t, $t+\Delta t/3$ and $t+2\Delta t/3$ of a time period $t\sim t+\Delta t$, with only one light source turned on at a time-point. In each time period, M=3 light sources are switched on and off sequentially. The optical wave-guide device 13 is constructed by an optical wave-guide body 1301, an entrance pupil 1305, a coupling-in device 1302, reflecting surfaces 1303, a coupling-out device 1304, and an exit pupil 1306. The relay device 12 is placed between the sequential-switching light-source array 11 and the optical wave-guide device 13 to modulate the light emitting from each light source. Due to different spatial positions of different light sources, the lights from different light sources enter the optical wave-guide device 13 through the entrance pupil 1305 while carrying different vector characteristics. In FIG. 1, specifically, a spherical lens is used as the relay device 12 and the light sources are point light sources. M=3 light sources 1101, 1102, and 1103 are placed on the focal plane of the relay device 12. Through the relay device 12, the light from each light source is converted into a parallel light with a corresponding incident angle when it enters the optical wave-guide body 1301 through the entrance pupil 1305. Then, guided by the coupling-in device 1302 and reflected by the reflective surfaces 1303, the light from a light source propagates along the optical wave-guide body 1301 toward the coupling-out device 1304. The reflective surfaces 1303 include a upper reflective surface and a lower reflective surface. Guided by the coupling-out device 1304, light from each light source exits the optical wave-guide body 1301 through the exit pupil 1306 with parallax state along corresponding direction. The exiting light from each light source works as a directional backlight for the display device 20. FIG. 1 presents the case when only the light source 1101 is turned on at the time-point t as an example to show the directional characteristics of the backlight from a light source. The backlights from other light sources at other time-points are all parallel light, but are endowed with different propagation directions. Specifically, in FIG. 1, the coupling-in device 1302 adopts a reflective surface, the coupling-out device 1304 is an array of semi-reflective and semi-transparent surfaces 1304a, 1304b, and 1304c. Taking multiple semi-reflective and semi-transparent surfaces 1304a, 1304b, and 1304c as coupling-out device 1304 expands the size of the exit pupil 1306 along the x-direction, which ensures that the exit light can cover following optical devices, such as the display device 20 or the wavefront modulation device 30. The expansion of the exit pupil can be designed along two directions in the optical wave-guide device 13. Here, only expansion along the x-direction is shown for simplicity. The following wavefront modulation device 30 converges the light from each light source. Specifically, the lights from the light sources 1101, 1102, and 1103 are correspondingly converged to the points $V_1$, $V_2$, and $V_3$ through the wavefront modulation device 30 in the FIG. 1, respectively. The points $V_1$, $V_2$, and $V_3$ are the images of the light sources 1101, 1102, and 1103 on the relay device 12, the optical wave-guide device 13, and the wavefront modulation device 30, respectively. That is to say, the light from each light source is endowed with vector characteristics and converges to a corresponding point. The display device 20 which is composed of pixels is placed between the wave-guide backlight unit with time-sequential directional light sources 10 and the wavefront modulation device 30, taking the lights from the wave-guide backlight unit with time-sequential directional light sources 10 as backlights. Each pixel modulates the incident light beam for information loading at each time-point. Through the wavefront modulation device 30, the enlarged virtual image of each pixel of the display device 20 is projected and constructs the virtual image $I_{20}$ of the display device 20. A pupil 50 of the viewer is placed around the points $V_1$, $V_2$, and $V_3$. Taking the diffraction effect of pixels into account, at each time-point, the virtual image of the display device 20 is visible within the zone around one of the points $V_1$, $V_2$, and $V_3$, which is the viewing zone corresponding to the turned-on light source at this time-point. In the figure, $M_{s1}$ and $M_{s2}$ are edge points of the virtual image $I_{20}$ of the display device 20 along the x direction. The control device 40 turns on the M=3 light sources sequentially with only one light source being on at each time-point. The display device 20 gets refreshed with the corresponding optical message synchronously by the control device 40 when each light source is turned on. At a time-point, the optical information loaded onto a pixel of the display device 20 is the projection information of the target scene along the reverse direction of the projection direction corresponding this pixel. The projection direction corresponding to a pixel at a time-point is the propagation direction of the light beam from this pixel when it enters into the corresponding viewing zone at this time-point.

Figure 2:
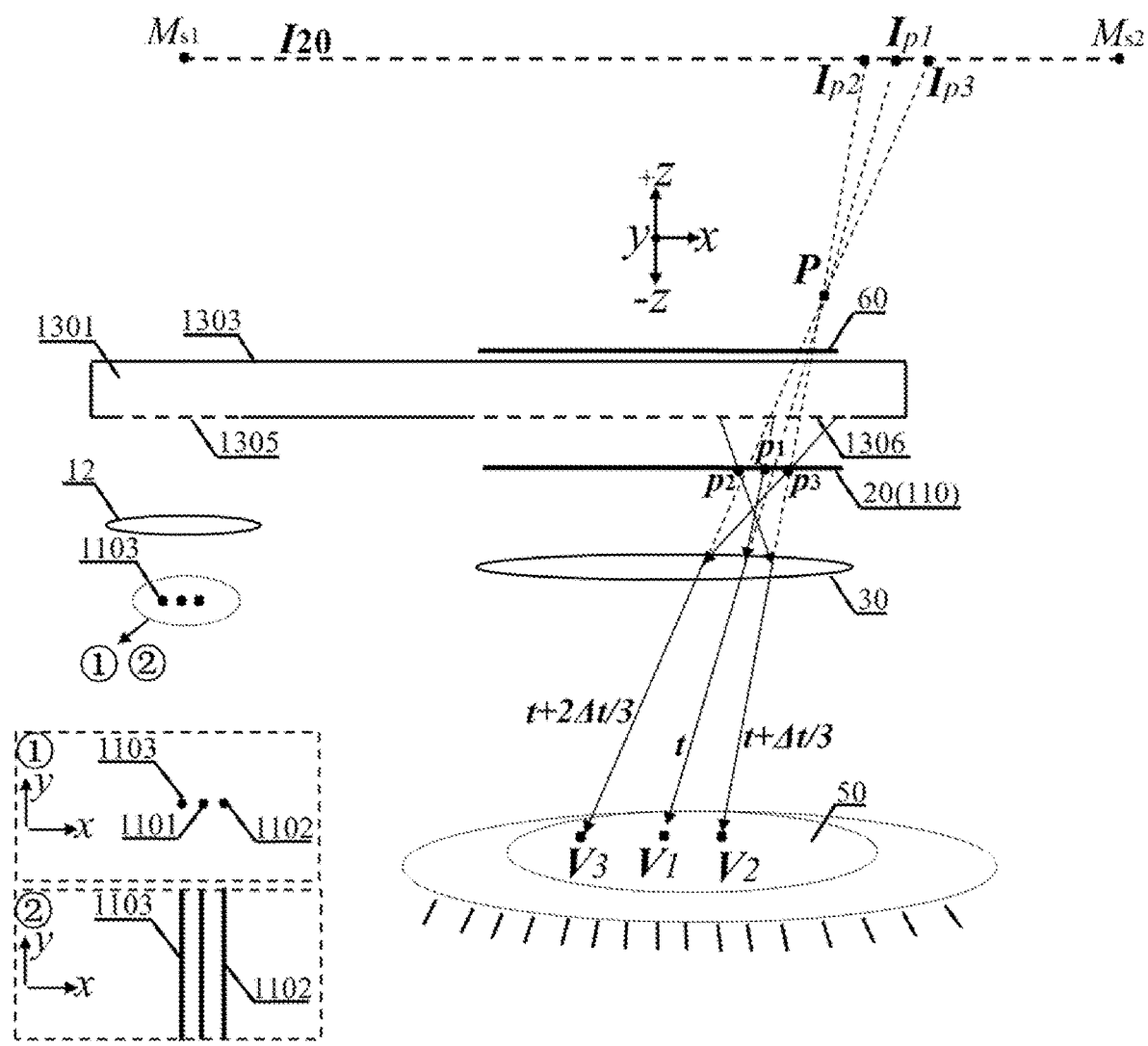
FIG. 2 is a schematic diagram showing the three-dimensional display based on the multiple-view-for-one-pupil technology.

FIG. 2 illustrates how the display based on the multiple-view-for-one-pupil mechanism gets implemented, with the prerequisite of multiple-view-for-one-pupil display lies in that at least two passing-through light beams for each spatial object point are perceived by a pupil 50. For the sake of simplicity and clarity of the illustration, some components of the optical wave-guide device 13 is not drawn in the FIG. 2. This kind of simplification also appears in other figures below. The parallel light from each of the light sources 1101, 1102, and 1103 exits the exit pupil 1306 at a corresponding propagation direction, and then is converged to corresponding one of the points $V_1$, $V_2$, and $V_3$ through the wavefront modulation device 30. The points $V_1$, $V_2$, and $V_3$ are covered by the pupil 50 of the viewer. For an object point P, its connection lines with points $V_1$, $V_2$, and $V_3$ intersect the virtual image $I_{20}$ of the display device 20 at points $I_{p1}$, $I_{p2}$, and $I_{p3}$, respectively. The points $I_{p1}$, $I_{p2}$, $I_{p3}$ are the virtual images of the pixels $p_1$, $p_2$, and $p_3$ on the virtual image $I_{20}$, respectively. Then the light beams emitted by the pixels $p_1$, $p_2$, and $p_3$ at different time points of a time period can be equivalently regarded as the directional light beams $I_{p1}V_1$, $I_{p2}V_2$, $I_{p3}V_3$ emitted by the points $I_{p1}$, $I_{p2}$, and $I_{p3}$ at corresponding time-points, respectively. The directional light beams $I_{p1}V_1$, $I_{p2}V_2$, $I_{p3}V_3$ superimpose at the point P. When the time period $\Delta t$ is small enough, a spatial light spot gets presented at the point P where the eye can naturally focus on. Other object points of the target scene are displayed similarly. Actually, perceiving at least two of the directional light beams $I_{p1}V_1$, $I_{p2}V_2$, $I_{p3}V_3$ can activate the multiple-view-for-one-pupil mechanism. That is to say, the interval between adjacent two viewing zones being not larger than the diameter of the pupil 50 is necessary for multiple-view-for-one-pupil mechanism display.

The control device 40 controls the sequential turn-on of the M=3 light sources at adjacent M=3 time-points of each time period, with only one light source being turn-on at each time-point and the display device 20 gets refreshed synchronously. Thus, three-dimensional display free from vergence-accommodation conflict gets implemented based on persistence of vision. At a time-point, the optical information loaded onto a pixel is the projection information of the target scene along the reverse direction of the projection direction corresponding this pixel. The projection direction corresponding to a pixel at a time-point is the propagation direction of the light beam from this pixel when it enters into the corresponding viewing zone at this time-point. Taking the pixel $p_1$ of the FIG. 2 as an example, the loaded optical information is the projection information of the target scene along the directional light beams $I_{p1}V_1$.

Figure 3:
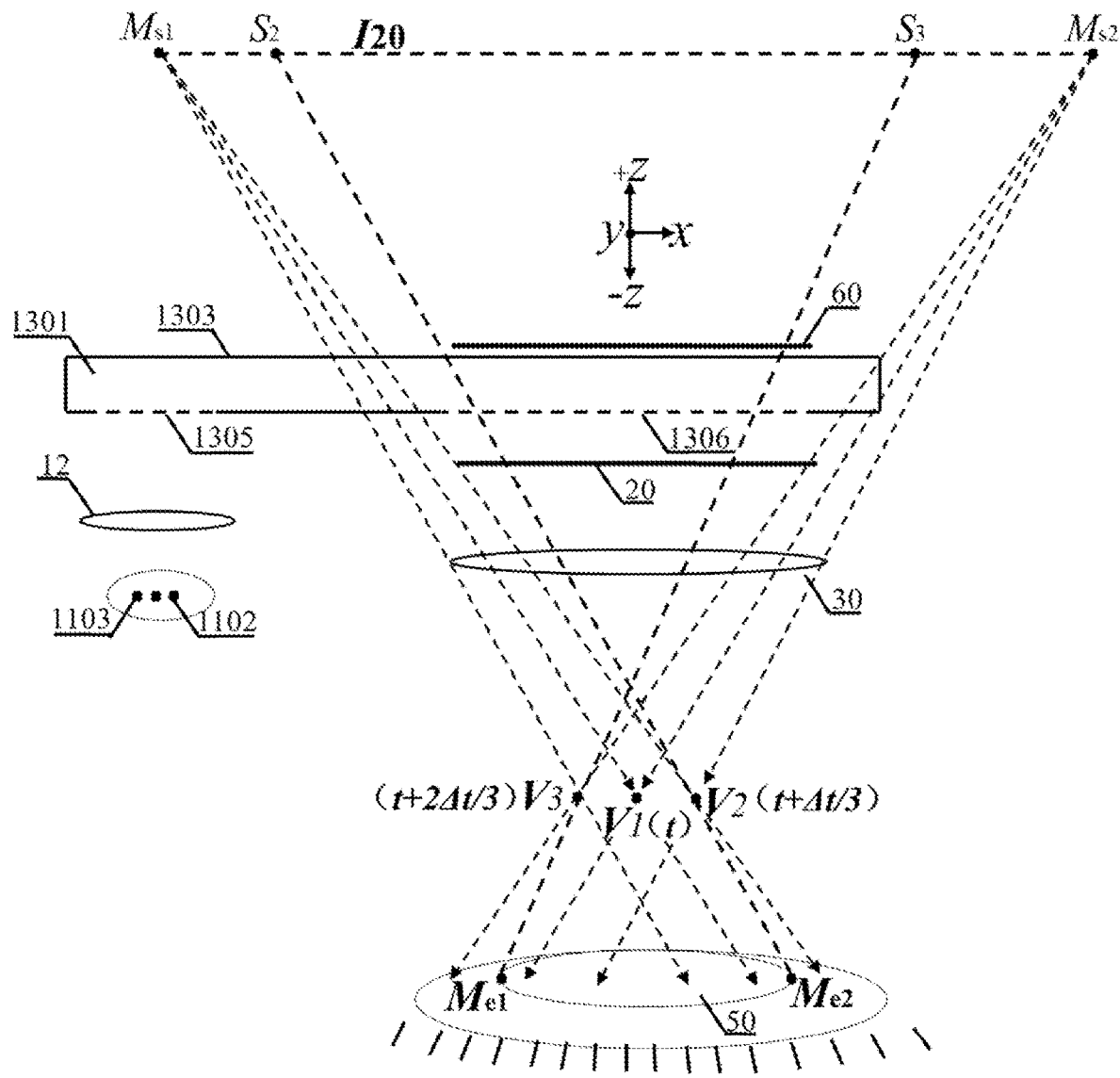
FIG. 3 shows the light beams perceived by the pupil which has a distance to the viewing zones.

In FIG. 1 and FIG. 2, the pupil 50 locates at the plane containing the points $V_1$, $V_2$, and $V_3$, which is also the plane containing the viewing zones. When the pupil 50 deviates from the plane containing points $V_1$, $V_2$, and $V_3$, the prerequisite of multiple-view-for-one-pupil display demands the interval between adjacent two points of the points $V_1$, $V_2$, and $V_3$ smaller than the diameter of the pupil 50. Under this condition, at a time-point, the displayed image on the whole display device 20 may be partially visible to the pupil 50. As shown in FIG. 3, the pupil 50 deviates from the plane containing points $V_1$, $V_2$, and $V_3$ by a distance. At time-point t, all the light beams projected by the display device 20, which passes through the viewing zone around the point $V_1$ are perceived by the pupil 50. At time point t+$\Delta t$/3, the virtual image of pixels within the $S_2M_{s1}$ area is invisible to the pupil 50; at time point t+2$\Delta t$/3, the virtual image of pixels within the $S_3M_{s2}$ area is invisible to the pupil 50. Here, $S_2$ is the intersection point of the line connecting the edge point $M_{e2}$ of the pupil 50 and point $V_2$ to the $I_{20}$; $S_3$ is the intersection point of the line connecting the edge point $M_{e1}$ of the pupil 50 and point $V_3$ to the $I_{20}$. Then, in a time period, each pixel projecting at least two light beams to the pupil 50 supposes that all pixels exit lights at each time-point. That is to say, at least two images of the target object are perceived by the pupil 50. This also can satisfy the prerequisite of multiple-view-for-one-pupil display. Especially, each pixel within the $S_2S_3$ area of the $I_{20}$ projects three directional light beams to the pupil 50 in this process. The pupil 50 also can be placed with a smaller distance to the display device 20 than the plane containing points $V_1$, $V_2$, and $V_3$.

To implement a multiple-view-for-one-pupil display, the light sources can be either point light sources or line light source, as shown by the picture at the bottom left corner of the FIG. 2. When point light sources are adopted, as discussed above, the viewing zones around the points $V_1$, $V_2$, and $V_3$ which are images of the point light sources are spot-shaped viewing zones. The point light sources are preferred to be arranged along two-dimensional directions, thus providing a two-dimensional eye box for the pupil 50.

The above figures only show the light source along a one-dimensional direction for simplification.

When adopting line light sources, they only need to be arranged along a one-dimensional direction, as the arrangement along the x-direction shown in above figures for display with one-dimensional parallax. Under this condition, the strip-shaped viewing zones get presented. It should be noted that, the light beam incident onto a pixel will have a field angle along a one-dimensional direction, for example the y-direction when line light sources are employed in the FIG. 2. The modulated light beam from this pixel will keep this field angle, or even take a larger field angle along this one-dimensional direction due to diffraction effect. Thus, the light beam from a pixel can cover the pupil 50 along this one-dimensional direction, which is named as non-parallax direction. At least two passing-through light beams of different directions mentioned above means that they have different directions in the plane perpendicular to the non-parallax direction. Under this condition, the projection direction of the light beam from a pixel in the plane containing the non-parallax direction refers to the propagation direction of a light ray belong to this light beam, which reaches to the pupil 50 or reaches to the position where the pupil 50 appears frequently. Taking FIG. 1 as an example, the light sources 1101, 1102, and 1103 are all line light sources aligned along the x direction, with their long directions along the y direction. Propagating through the relay device 12, the coupling-in device 1302, the reflective surfaces 1303, the coupling-out device 1304, and the wavefront modulation device 30, the lights from light sources 1101, 1102, and 1103 converge into image points $V_1$, $V_2$, $V_3$ in a plane perpendicular to the y-direction, respectively. The image of a light source has a length along the y-direction, that is to say, the y-direction is the long direction of this image. This means strip-shaped viewing zones aligned along the x-direction get presented. The long direction of each viewing zone is consistent with the non-parallax direction. The y-direction is the non-parallax direction in the FIG. 1 and FIG. 2. Differently, when point light sources are used, the light beam from a light source does not have a non-parallax direction. A group of separated point light sources arranged along a one-dimensional direction also can be seen as a line light source. When a cylindrical lens functioning as the wavefront modulation device 30 and point light sources are adopted in the display module, strip-shaped viewing zones also can get presented. In this case, a scattering element 110 is attached to the display device 20 for scattering the exit light beams along the non-parallax direction, so to guarantee the pupil 50 perceiving light beams from all the pixels along the non-parallax direction. A scattering element 110 attached to the display device 20 is shown in FIG. 2. Actually, as long as strip-shaped viewing zones are presented, the scattering element 110 can be attached to the display device 20 to scatter light along the non-parallax direction, for example when the line light sources are adopted. The combination of point light sources and a scattering element 110 also can present strip-shaped viewing zones. When strip-shaped viewing zones get presented, the wavefront modulation device 30 will only reserve the modulation along the arrangement direction of the strip-shaped viewing zones, for example taking a cylindrical lens as the wavefront modulation device 30.

Figure 4:
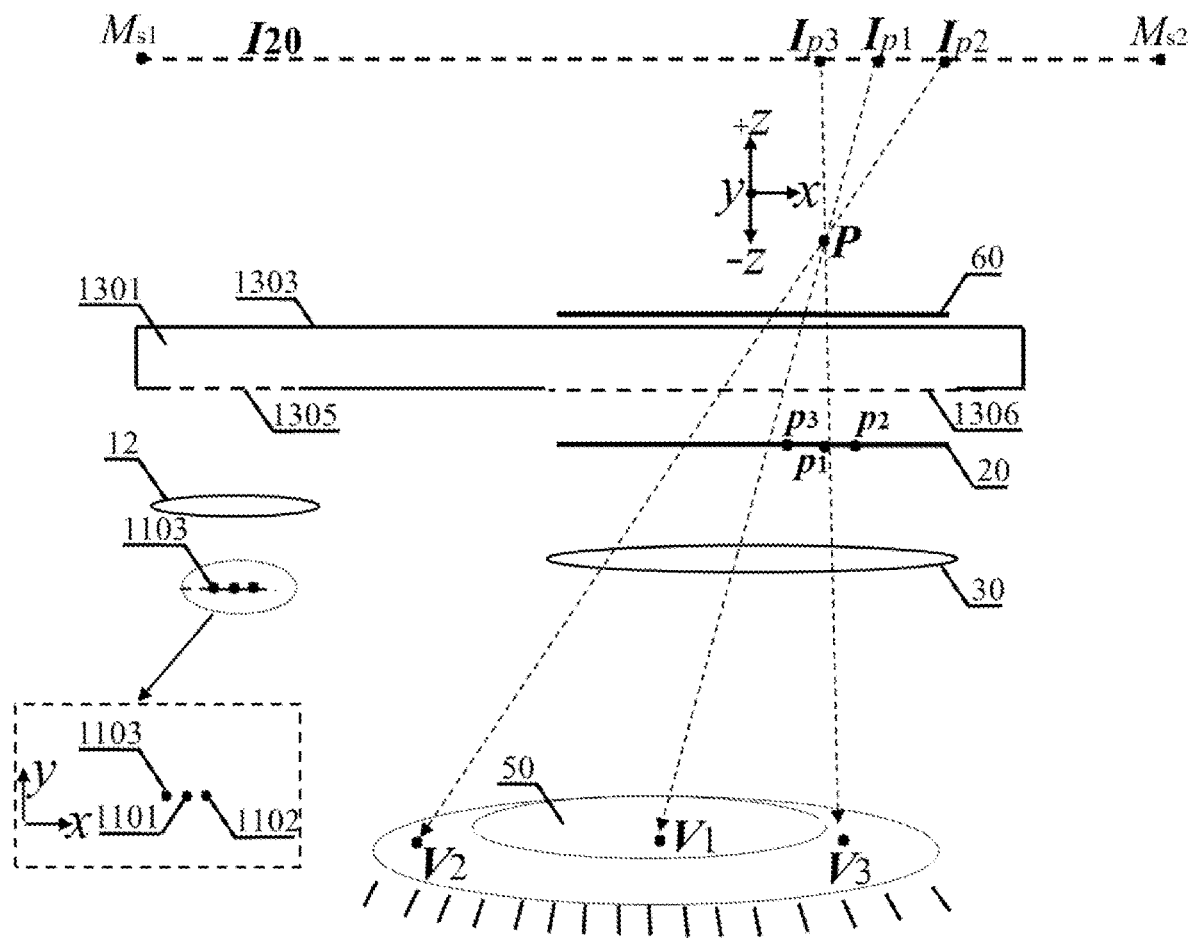
FIG. 4 shows the display based on the Maxwellian view technology.

When the interval between adjacent two of points $V_1$, $V_2$, and $V_3$ in FIG. 3 becomes larger, the case that only one point falls into the pupil 50 will appear. As shown in FIG. 4, only $V_1$ is covered by the pupil 50. Under this condition, parallel light from a point light source 1101 incidents on the display device 20 as backlight. Then, the exit light which carries the optical information loaded by the display device 20 converges into a viewing zone around the point $V_1$. When the divergence angle of the light beam from each pixel is small enough, the light intensity distribution gradient of the light beam along its propagation direction can meet the requirements of Maxwellian view display. Thus, the displayed scene within a certain depth range around the virtual image of the display device 20 can capture the focus of the corresponding eye, thus kicking off the vergence-accommodation conflict. To implement Maxwellian view display, the spot-shaped viewing zones are necessary and point light sources are the prerequisite. For the case shown in FIG. 4, viewing zones around the points $V_2$ and $V_3$ do contribute nothing to the display. However, the existence of viewing zones around the points $V_2$ and $V_3$ are necessary for constructing an eye box for the pupil. Two-dimensional-distribution spot-shaped viewing zones are preferred for two-dimensional eye-box. The wave-guide device with exit pupil expanded along two two-dimensional directions is preferred. Furthermore, a compensation unit 60 can be placed between the external environment and the wavefront modulation device 30 for eliminating the impact of the wavefront modulation device 30 on the optical information from the external environment. Under this condition, a transparent display device 20 is preferred for augmented reality applications.

When the pupil 50 deviates toward both sides from the plane containing the points $V_1$, $V_2$, and $V_3$, the Maxwellian view display gets implemented as long as one passing-through light beam of each object point is perceived by the pupil 50. When only one passing-through light beam for each of partial object points and more than one passing-through light beams for each of the other partial object points are perceived by the pupil 50, the display gets implemented by the hybrid mechanisms of the Maxwellian view and multiple-view-for-one-pupil. When more than one passing-through light beams for any object points are perceived by the pupil 50, the multiple-view-for-one-pupil mechanism works alone.

Figure 5:
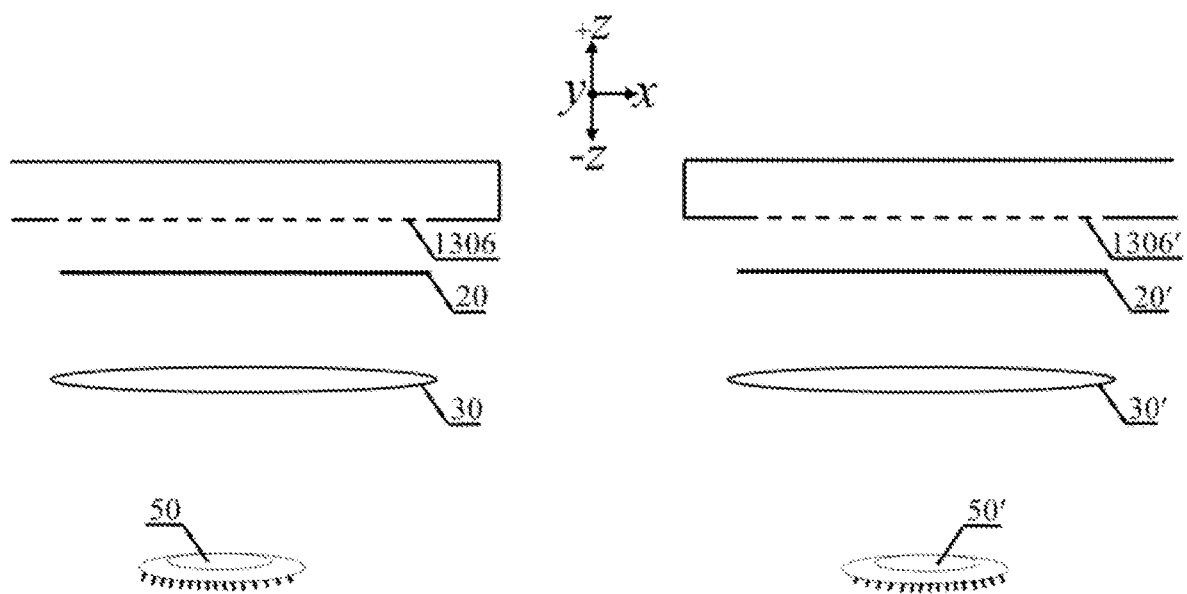
FIG. 5 shows the structural diagram of a display system with two display modules for the viewer's two eyes.

The three-dimensional display modules in FIGS. 1 to 4 are drawn for only one eye of the viewer. To build a binocular display system, two three-dimensional display modules corresponding to the left pupil 50 and the right pupil 50' of the viewer respectively are required, as shown in the FIG. 5. For the sake of simplicity and clarity in illustration, not all components of each three-dimensional display module are drawn in the FIG. 5.

Figure 6:
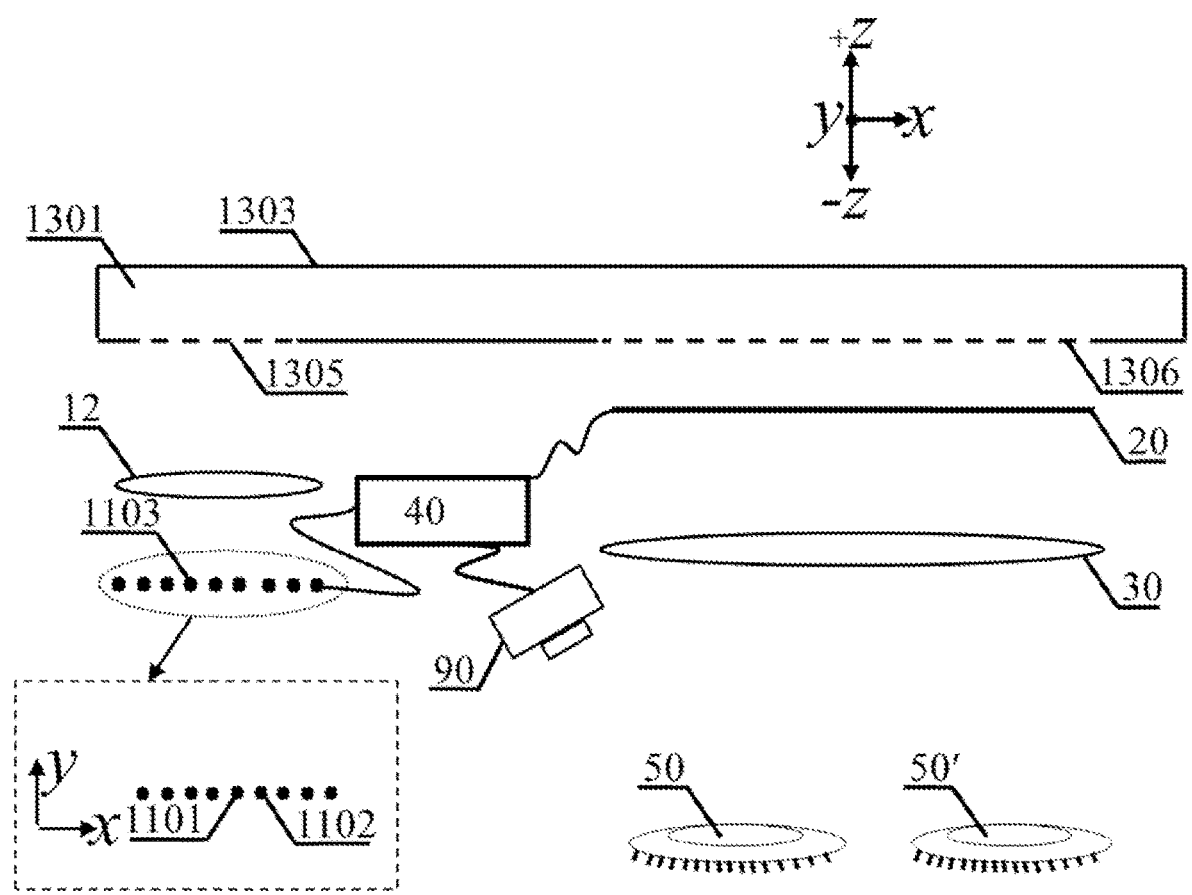
FIG. 6 shows the structural diagram of a display system with one display module for the viewer's two eyes.

At the same time, such a three-dimensional display module also can be used as a binocular display system, directly projecting information to two pupils of a viewer, as shown in FIG. 6.

With more light sources, more directional light beams passing through each object point can be projected into the pupil 50 for better display effect, or more directional light beams passing through each object point cover larger spatial range for a larger eye box. However, more light sources require display device 20 with a higher frame rate for flicker-free display. A pupil positioning unit 90 can be introduced to alleviate this high requirement. As shown in FIG. 6, the pupil positioning unit 90 is designed to detect the spatial position(s) of the pupil(s) 50 real-timely. According to the real-time spatial position(s), the control device 40 determines the N light sources whose emitting light beams reach into the pupil(s) 50, where $M \geq N \geq 2$. Then, only these N light sources are activated at N time-points of each time period, with the other (M-N) light sources are turned off to reduce the display requirement on the frame rate of the display device 20.

Figure 7:
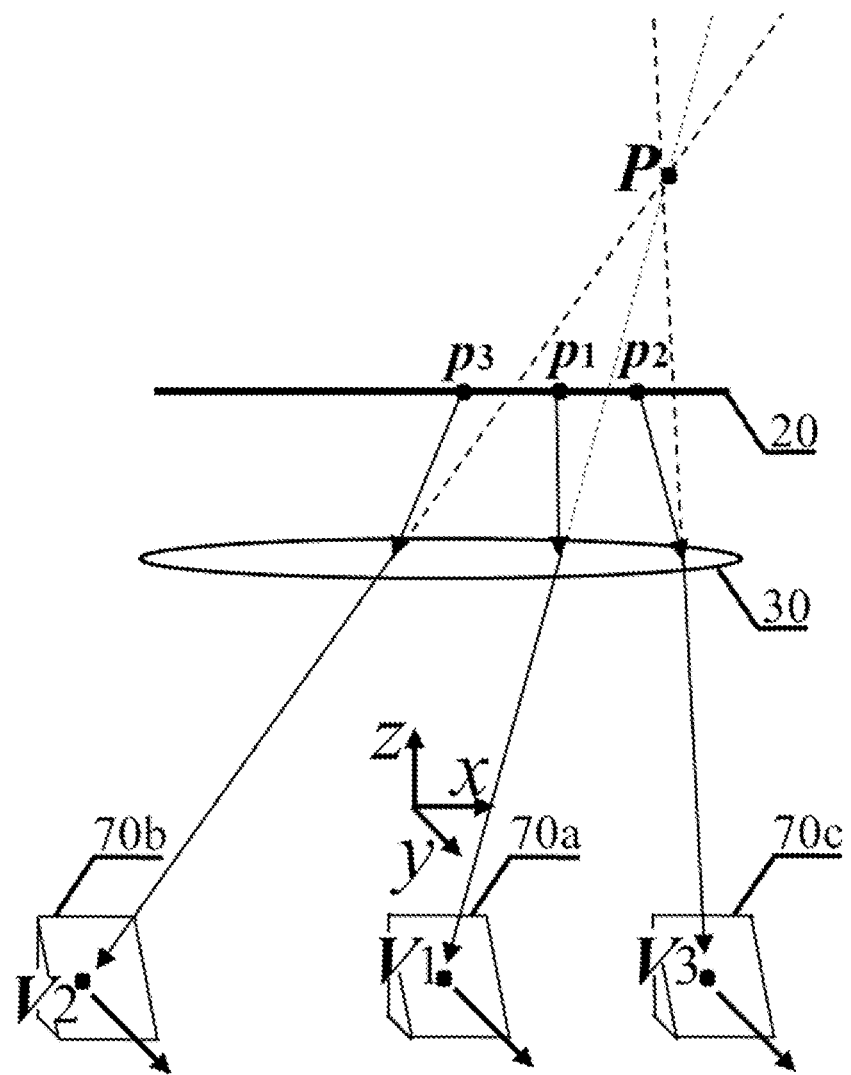
FIG. 7 is an example of the deflection device with distributed discrete components.
Figure 8:
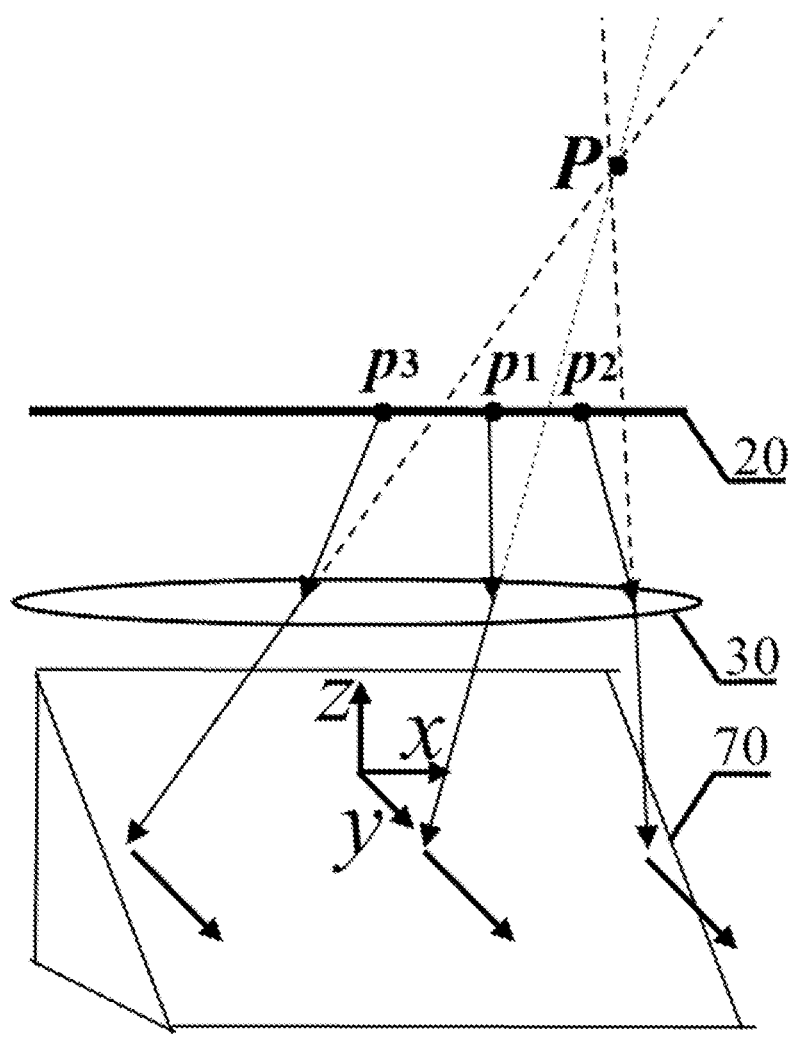
FIG. 8 is an example of the deflection device with an integrative structure.

Furthermore, a deflection device 70 can be inserted to deflect the light propagation path for a compact optical structure or/and allow optical information from external environment passing-through, as shown in FIGS. 7 and 8. The deflection device 70 of the FIG. 7 is a structure of distributed discrete components. Concretely, M=3 separated deflection mirrors 70a, 70b, and 70c construct the deflection device 70. The M=3 separated deflection mirrors 70a, 70b, and 70c are placed at the images of the M=3 light sources 1101a, 1101b, and 1101c, respectively. That is to say, the separate deflection mirrors are placed on a plane intersecting with the plane containing the viewing zones. The M=3 separated deflection mirrors 70a, 70b and 70c can be designed to be small sized, and the gap between them allows the incidence of external ambient light. The M=3 separated deflection mirrors 70a, 70b, and 70c themselves may also allow the passing-through of external ambient light. The separated deflection mirrors also can be placed with a distance to the viewing zones. The deflection device 70 shown in FIG. 8 is an integrative deflection mirror, which also can be placed on the plane intersecting with the viewing zones, or not. This kind of deflection device 70 can also be designed allowing the passing-through of external ambient light, for example adopting a semi-reflective and semi-transparent surface as the deflection device 70. When the deflection device 70 is introduced, after operating above process, the image of the display device 20 is imaged on the wavefront modulation device 30 and the deflection device 70. Here, the separated deflection mirrors or integrative deflection mirror also can be designed with curved surfaces. For example, curved surfaces play function of lens to reduce the divergence of the passing-through light beams.

Figure 9:
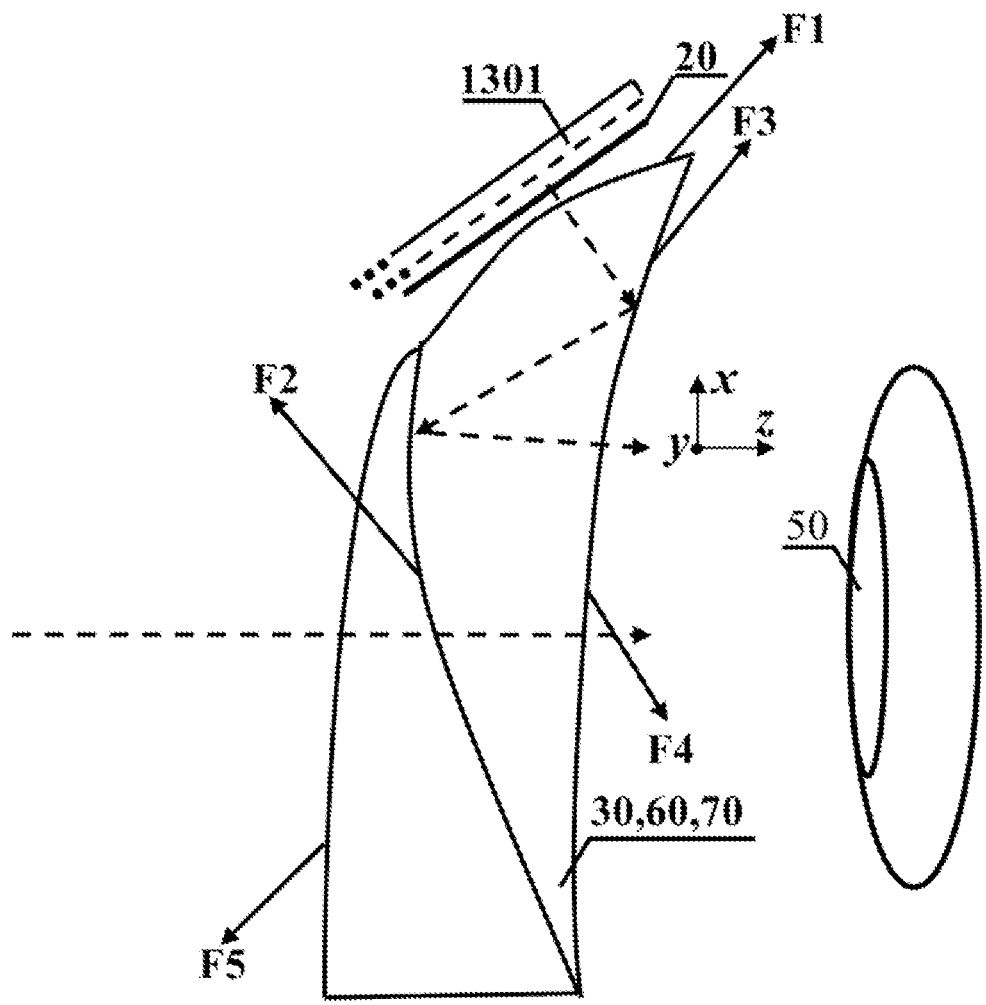
FIG. 9 shows a composite structure that integrates the functions of the deflection device, the compensation unit, and the wavefront modulation device.

Discrete devices of the three-dimensional display module can also be integrated into a composite structure. For example, the free-form surface composite structure shown in FIG. 9 integrates the functions of the deflection device 70, the compensation unit 60 and the wavefront modulation device 30. Concretely, the curved surface F1 of the free-form surface composite structure is a transparent surface, the curved surface F3 is a reflective surface, the curved surface F2 is a semi-reflective and semi-transparent surface, and the curved surface F4 is a transparent surface. The curved surfaces F1, F3, F2, and F4 jointly participate in the imaging of the display device 20 which is not shown here and play the function of the wavefront modulation device 30. The curved surface F5 eliminates the influence of the curved surfaces F2 and F4 on the incident light from the external environment and functions as the compensation unit 60. The curved surfaces F3 and F2 function as the deflection device 70.

In the three-dimensional display module, the wavefront modulation device 30 also can be a zoom lens with a controllable focus, which projects multiple virtual images of the display device 20 to different depths in time sequence under the driving of the control device 40. For each image of the display device 20, M light sources project backlights sequentially, with corresponding information loaded onto each pixel of the display device 20 synchronously. Or, according to the viewer's binocular convergence depth detected by an external auxiliary device, the control device 40 drives the wavefront modulation device 30 to project the virtual image of display device 20 to the viewer's binocular convergence depth or a depth near it real-timely, with all pixels of the display device 20 refreshed by corresponding optical message synchronously. The wavefront modulation device 30 with a controllable focus can be a liquid crystal lens with changeable focal length under the driving of the control device 40, or a compound liquid crystal lens stacked by more than one liquid crystal plates. The different combinations of the compound liquid crystal lens under the driving of the control device 40 present different focal lengths.

Figure 10:
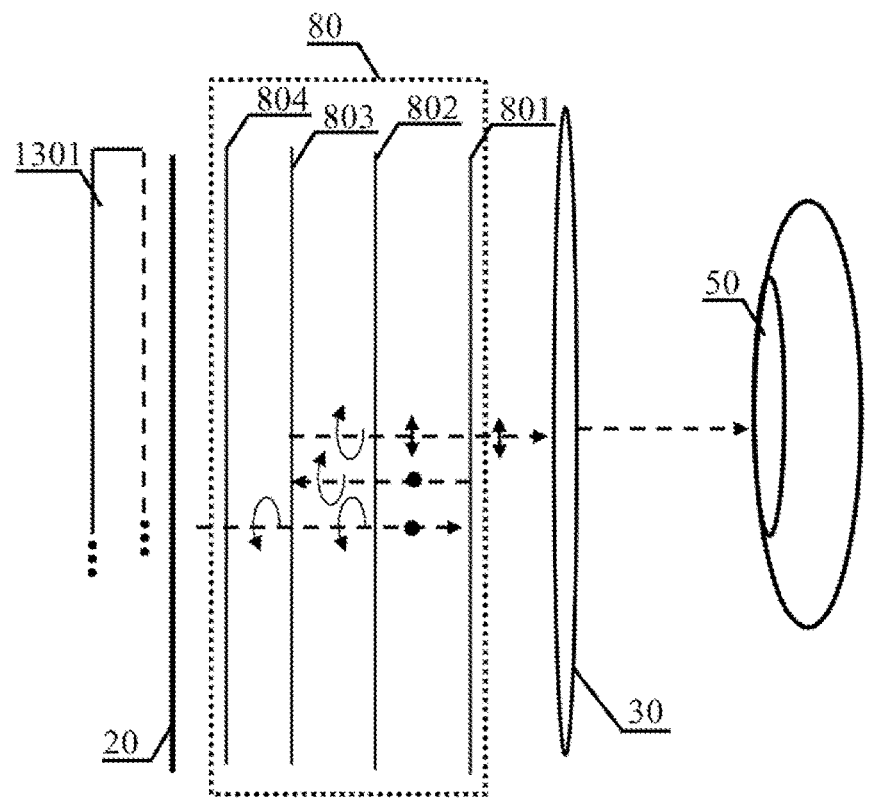
FIG. 10 shows the schematic diagram of a light-path-folding structure.

Furthermore, a light-path-folding structure 80 also can be inserted into the light propagation path for compact optical structure. FIG. 10 shows the case of inserting a light-path-folding structure 80 between the display device 20 and the wavefront modulation device 30. The light-path-folding structure 80 consists of a first modulation plate 804, a semi-reflective and semi-transparent plate 803, a second modulation plate 802, and a selective-reflection/transmission device 801. The selective-reflection/transmission device 801 reflects light with one kind of characteristics and transmits light with another kind of characteristics, which are named as reflection characteristics and transmission characteristics respectively. The second modulation plate 802 modulates the light of reflection characteristics into light of transmission characteristics when the light passes through it twice.

After passing through the first modulation plate 804 and the second modulation plate 802, the incident light with reflection characteristics incidents on the selective-reflection/transmission device 801. Reflected by the selective-reflection/transmission device 801, the light passes through the second modulation plate 802, and is reflected by the semi-reflective and semi-transparent plate 803. So, the light propagates through the second modulation plate 802 a second time, with the optical characteristics being converted to transmission characteristics. At last, passing through the selective-reflection/transmission device 801, the light with transmission characteristics enters the viewing zones. The insertion of the light-path-folding structure 80 shortens the spatial distance between the display device 20 and the wavefront modulation device 30 to get a thin optical structure. Specifically, in FIG. 10, the horizontal polarization is taken as the transmission characteristic, denoted by "↔", and the vertical polarization works as the reflection characteristic, denoted by "●". The second modulation plate 802 is a quarter wave plate. After passing through the first modulation plate 804, the light from the display device 20 is modulated into circular polarization light. Then, propagating through the semi-reflective and semi-transparent plate 803, the transmission light is modulated into "●" state by the second modulation plate 802. The light of "●" state is reflected by the selective-reflection/transmission device 801. The reflected light passes through the second modulation plate 802 and is reflected again by the semi-reflective and semi-transparent plate 803 and incidents onto the second modulation plate 802 a second time, being converted into light with "↔" state. Finally the light reaches to the corresponding viewing zone through the selective-reflection/transmission device 801.

Figure 11:
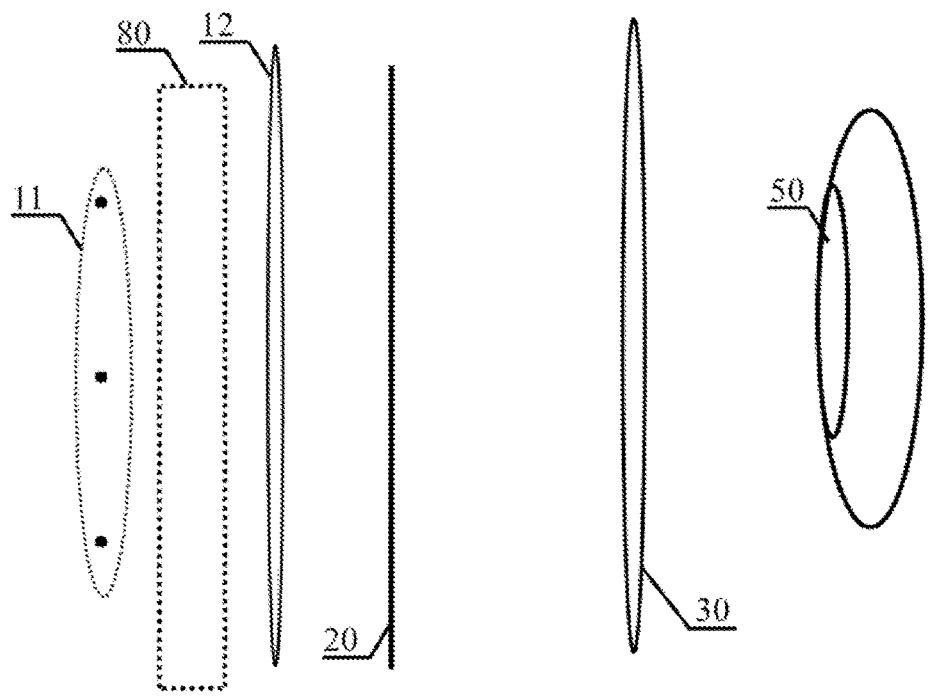
FIG. 11 shows a three-dimensional display module with the wave-guide device being replaced by a light-path-folding structure.

Similarly, a light-path-folding structure 80 also can be inserted between the wavefront modulation device 30 and the viewing zones. Or two light-path-folding structures 80 are respectively inserted at these two positions. In the optical structure discussed above, the optical wave-guide device 13 can be replaced by a light-path-folding structure 80, with the relay device 12 placed in front of the light-path-folding structure 80 along the propagating direction of the light, as shown by FIG. 11. Furthermore, the relay device 12 also can be removed from the optical structure shown in the FIG. 11.

Figure 12:
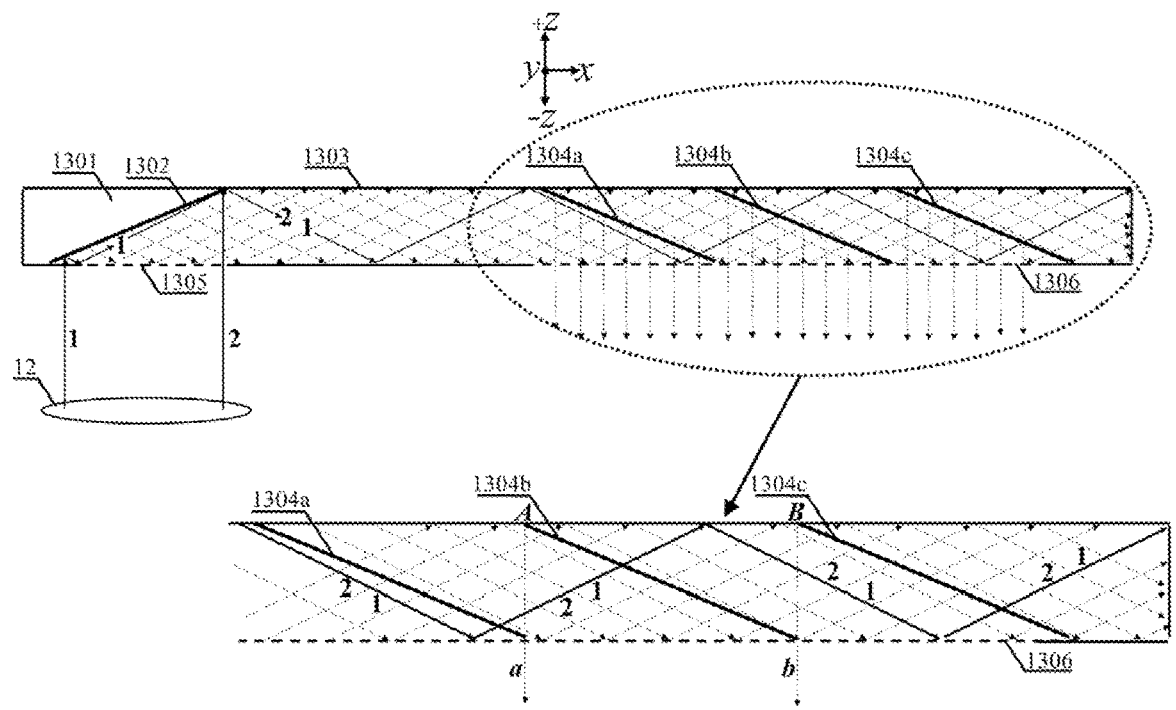
FIG. 12 shows a coupling-out device providing parallel exit light along the x-axis.
Figure 13:
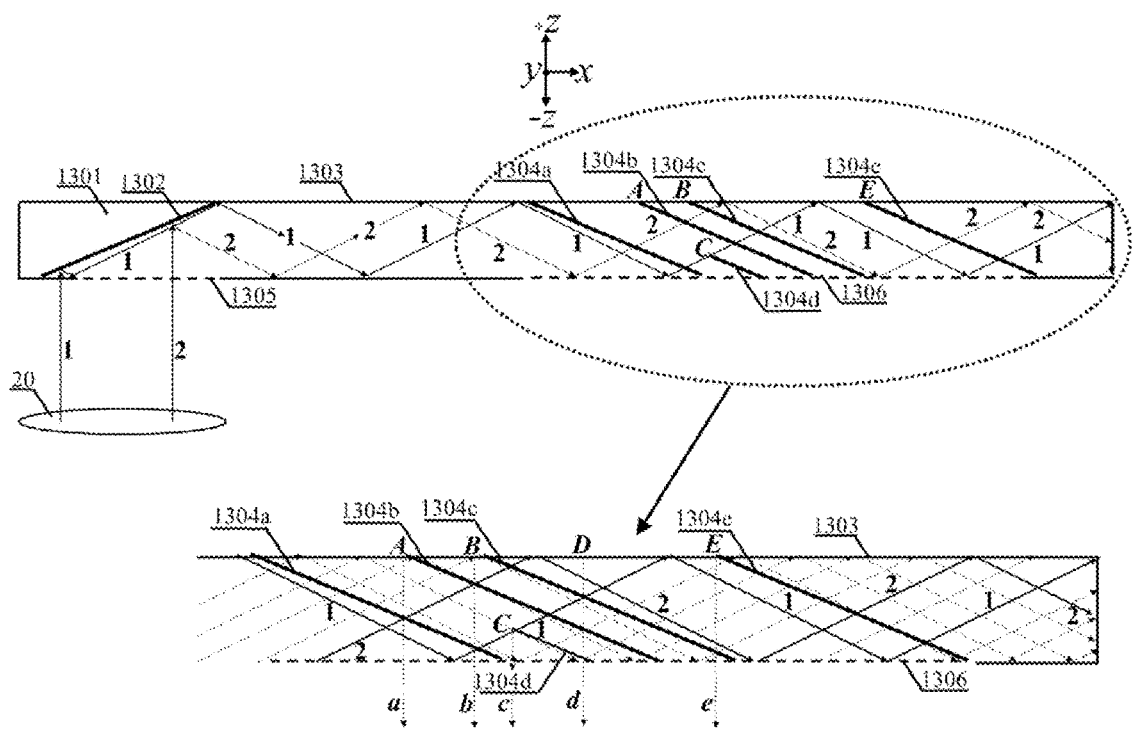
FIG. 13 shows another coupling-out device providing parallel exit light along the x-axis.

In the above example, light from each point light source or each point of a line light source enters the optical wave-guide body 1301 in the form of parallel light, and exits the optical wave-guide body 1301 keeping parallel light state. In order to make the light from each light source cover all pixels of the display device 20, the coupling-out device 1304 shall be designed carefully. FIG. 12 shows an example with a coupling-out device 1304 composed of semi-reflective and semi-transparent surfaces aligned along x-direction. The maximum distance between adjacent semi-reflective and semi-transparent surfaces corresponds to the situation that they are end-to-end neighbored along the x-direction, as shown in FIG. 12. Light rays 1 and 2 are the two marginal light rays from a light source when it inters into the wave-guide body 1301 through the entrance pupil 1305 at a time-point. The distance between adjacent semi-reflective and semi-transparent surfaces is larger than the size of the entrance pupil 1305 along the x-direction. This results in that some pixels of the display device 20 have no corresponding incident light beams at this time-point. To ensure that all pixels of the display device 20 have corresponding incident light beams at each time point, the necessary setting of the semi-reflective and semi-transparent surfaces is shown in FIG. 13. On the semi-reflective and semi-transparent plane 1304*a*, the reflected light beams reach to point A along the +x-direction. So, semi-reflective and semi-transparent surface 1304*b* is placed with its left marginal point at the point A. Then, on the semi-reflective and semi-transparent surface 1304*b*, the reflected light beams reach to point B along the +x-direction and a semi-reflective and semi-transparent plane 1304*c* is set with its left marginal point at the point B. The semi-reflective and semi-transparent surfaces 1304*c*, 1304*d* and 1304*e* are designed by the similar way.

Figure 14:
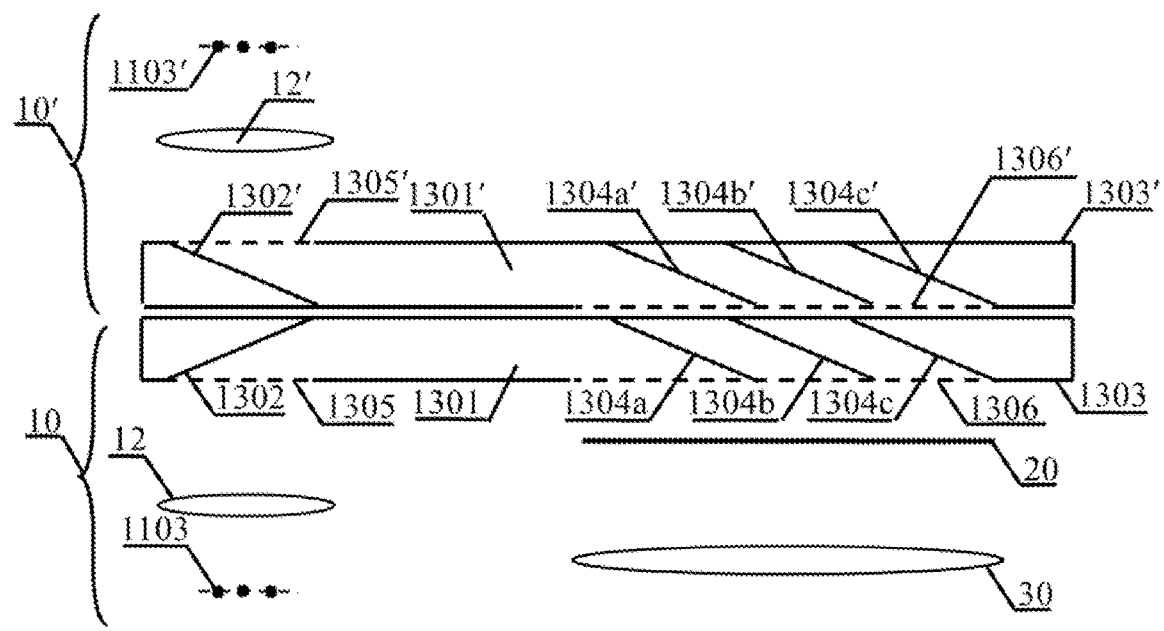
FIG. 14 is the schematic diagram of a structure combining two wave-guide backlight units together.

When the light from a light source can not cover all the pixels on the display device 20, an alternative method is to design more light sources in the wave-guide backlight unit with time-sequential directional light sources, or employ more than one wave-guide backlight unit with time-sequential directional light sources for the display device 20, to guarantee that lights from more than one light source can cover all the pixels. FIG. 14 gives an example that two wave-guide backlight unit with time-sequential directional light sources 10 and 10' are designed for the display device 20. At the same time, more than one wave-guide backlight unit with time-sequential directional light sources for the display device 20 can be designed to provide backlights of different wave lengths. These more than one wave-guide backlight unit with time-sequential directional light sources also can be equipped with common light sources.

In fact, even the light from the wave-guide backlight unit with time-sequential directional light sources 10 cannot completely cover all the pixels of the display device 20 at each time-point, the three-dimensional display module also can work well. For example, when the prerequisite of "one passing-through light beam for each object point perceived by the pupil 50" is satisfied in each time period, display based on Maxwellian view mechanism is presented. When the prerequisite of "more than one passing-through light beams for each object point perceived by the pupil 50" is satisfied in each time period, display based on multiple-view-for-one-pupil mechanism gets implemented.

Figure 15:
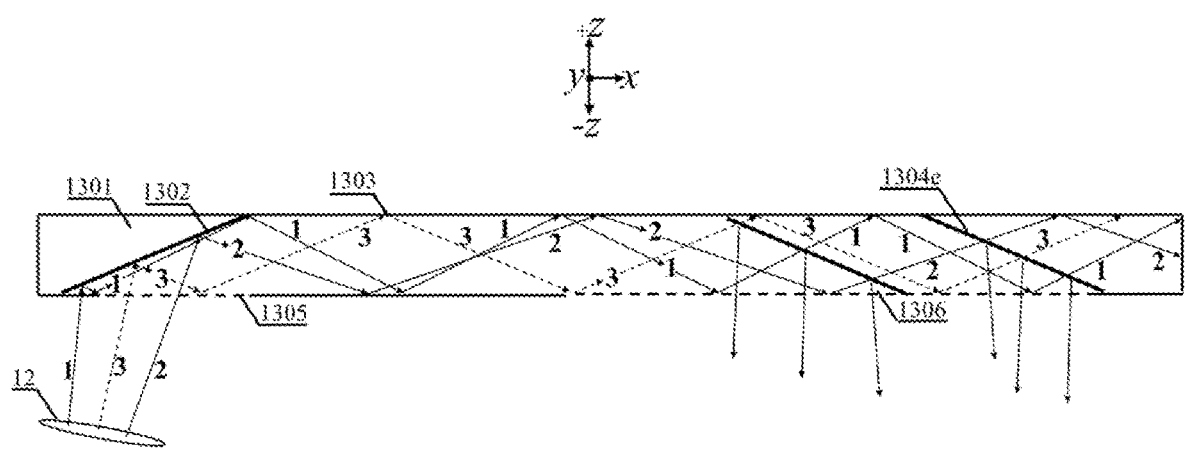
FIG. 15 shows the propagation path of a non-parallel light in the optical wave-guide device.

Above figures take parallel light along a corresponding direction as the vector characteristic of the backlight from a light source. The backlight from a light source also can be non-parallel light. As shown in FIG. 15, the light from a light source enters the optical wave-guide device 13 at a non-parallel state, and then exits the optical wave-guide device 13 as non-parallel backlight. The non-parallel backlight will converge to different images of the corresponding light source when it is reflected by the coupling-out device 1304 for different times. Here, the coupling-out device 1304 takes a group of semi-reflective and semi-transparent surfaces as example. Under this condition, when the prerequisite of "one passing-through light beam for each object point perceived by the pupil 50" is satisfied in each time period, display based on Maxwellian view mechanism is presented. When the prerequisite of "more than one passing-through light beams for each object point perceived by the pupil 50" is satisfied in each time period, display based on multiple-view-for-one-pupil mechanism gets implemented.

Figure 16:
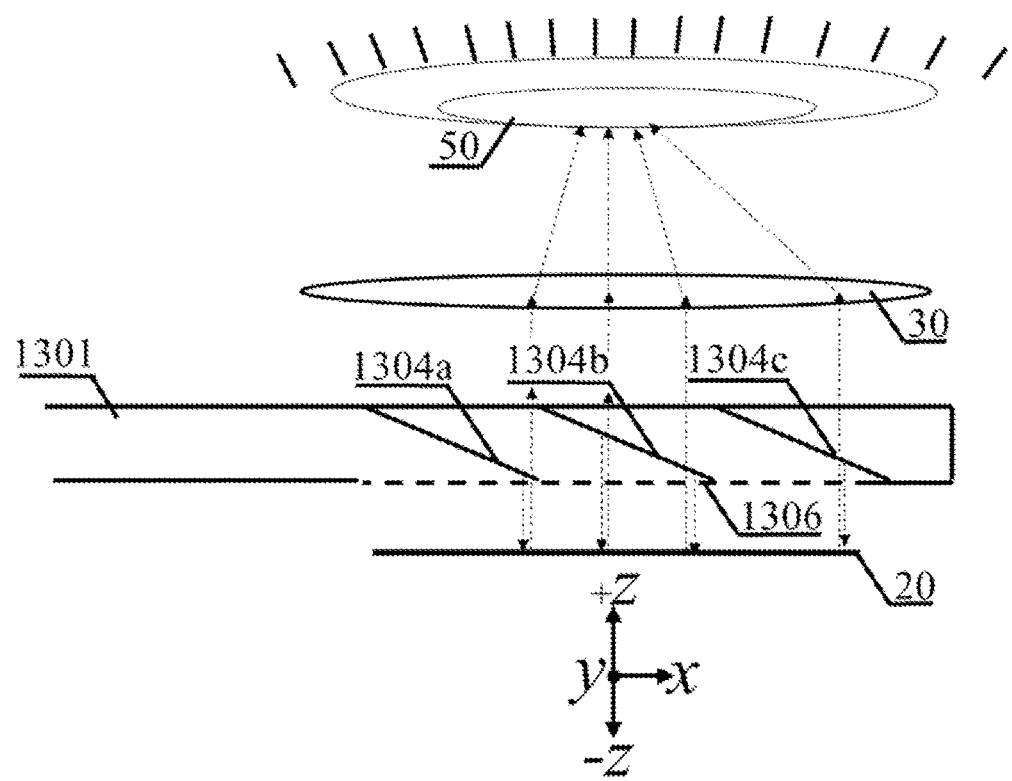
FIG. 16 shows a three-dimensional display module using a reflection-type display device.

The above figures are described by taking a transmission-type display device 20 as example. The display device 20 also can be a reflection-type device, as shown in FIG. 16.

Figure 17:
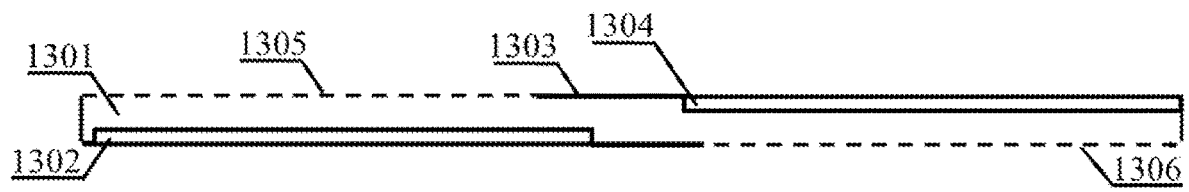
FIG. 17 shows the schematic diagram of another optical wave-guide device.

In above figures, a reflective surface is taken as the coupling-in device 1302 of the optical wave-guide device 13 and a group of semi-reflective and semi-transparent surface are used as the coupling-out device 1304. This is not all. Actually, all kinds of existing optical wave-guide structures can be taken as the optical wave-guide device 13 of present patent, such as a hollow cavity-type optical wave-guide structure, or optical wave-guide structures with other kinds of coupling-in or coupling-out structures. For example, the coupling-in device 1302 of the optical wave-guide structure shown in FIG. 17 can be a grating or an holographic element. The coupling-out device 1304 also can be a grating or holographic element. Furthermore, a group of optical wave-guide devices can be used, with each wave-guide device being responsible for guiding a monochromatic backlight. For example, three monochromatic optical wave-guide structures construct a optical wave-guide device 13, transmitting Red light, Green light and Blue light, respectively.

Figure 18:
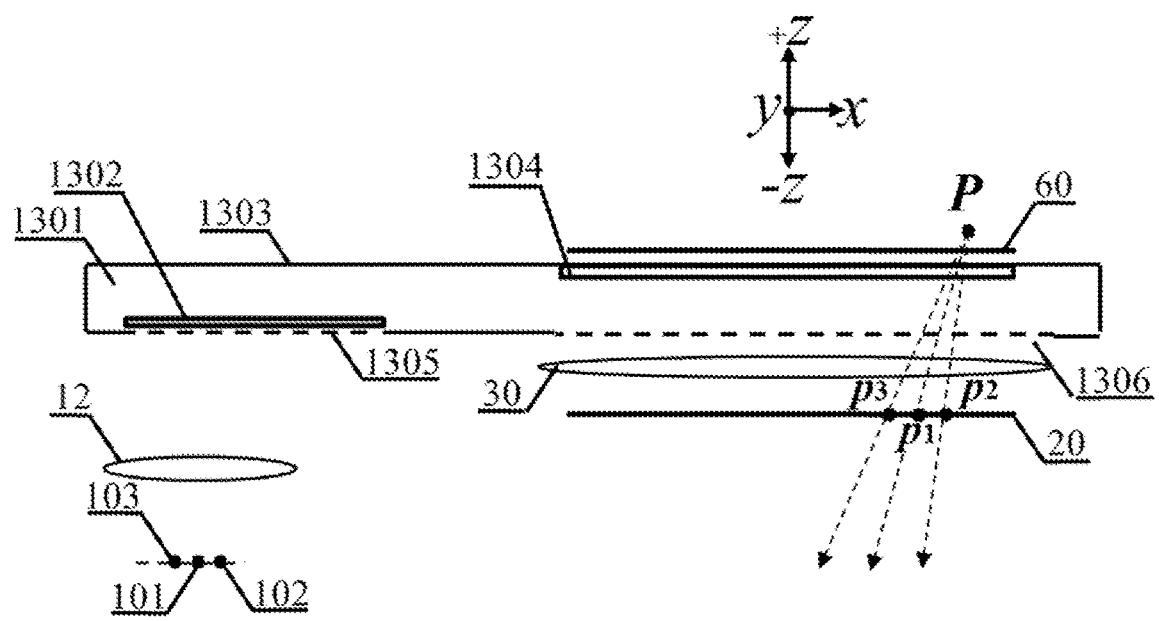
FIG. 18 is the schematic diagram of a three-dimensional display module with the wavefront modulation device behind the display device.
Figure 19:
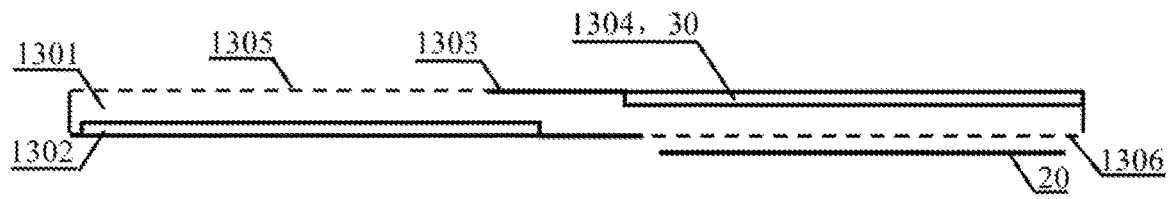
FIG. 19 is the schematic diagram of a three-dimensional display module with the wavefront modulation device and the coupling-out device being integrated together.
Figure 20:
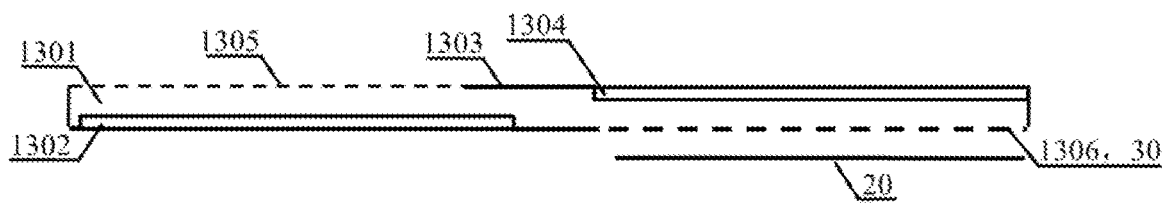
FIG. 20 is the schematic diagram of a three-dimensional display module with the wavefront modulation device and the exit pupil being integrated together.

In the above figures, along the propagating direction of the light, the wavefront modulation device 30 is placed in front of the display device 20, projecting an enlarged virtual image of the display device 20. The positions of the display device 20 and the wavefront modulation device 30 can exchange with each other. As shown in FIG. 18, when the wavefront modulation device 30 is placed behind the display device 20, no images of the display device 20 or the pixels appear. Under this condition, the wavefront modulation device 30 can be integrated into the optical wave-guide device 13. For example, the wavefront modulation device 30 is integrated into the coupling-out device 1304 in FIG. 19, and is integrated into the exit pupil 1306 in FIG. 20.

An image of each light source is projected through the relay device 12, the optical wave-guide device 13 and the wavefront modulation device 30 in the processes discussed above. This is not mandatory requirement. Actually, when a light source is activated at a corresponding time-point, the light beams from the display device 20 also can be spreading around a region, instead of converging to the image of the corresponding light source. As long as the prerequisite of "one passing-through light beam for each object point perceived by the pupil 50" or "more than one passing-through light beams for each object point perceived by the pupil 50" is satisfied, the three-dimensional display module can keep working for display free of vergence-accommodation conflict. Under this condition, the distribution zone of the light beams from the display device 20 when a light source is activated at a time-point is also called a viewing zone, and viewing zones corresponding to different time-points may overlap with each other.

Figure 21:
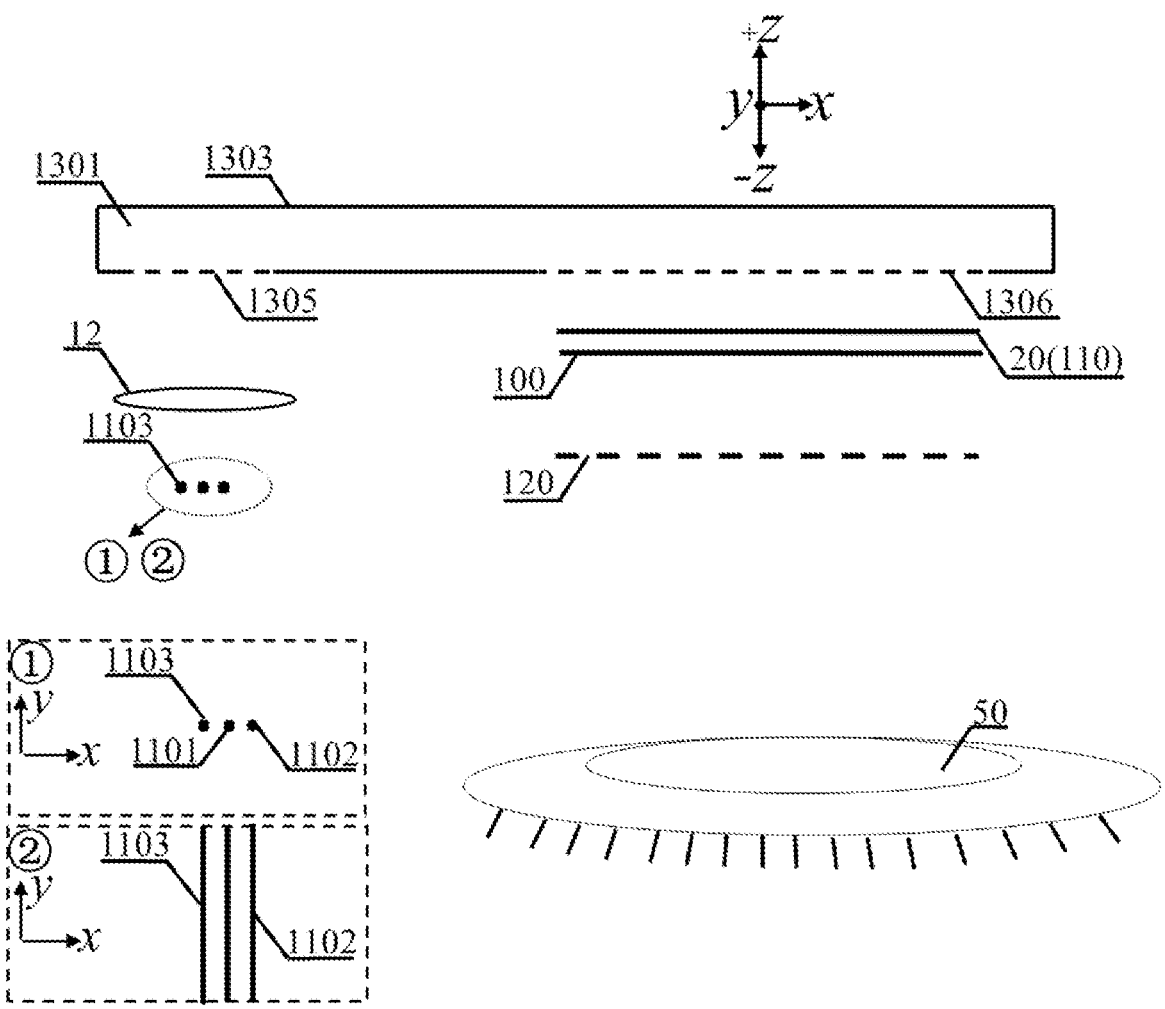
FIG. 21 shows the optical structure of a three-dimensional display module with a light splitting device.
Figure 22:
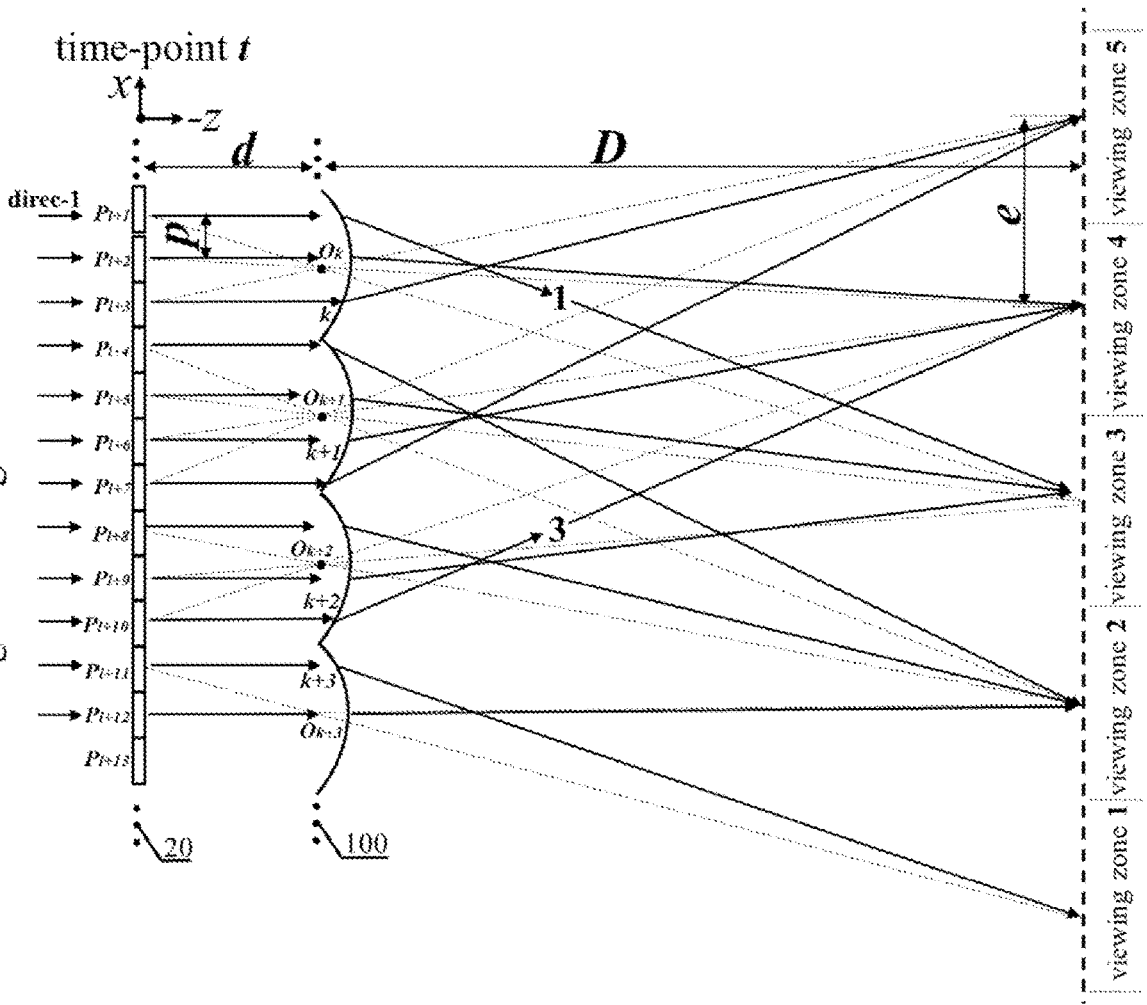
FIG. 22 shows the propagation paths of the light beams from the pixels when they pass through the light splitting device at time-point t.

With the wavefront modulation device 30, M light sources correspond to M viewing zones. To increase the number of viewing zones, the wavefront modulation device 30 in the above figures can be replaced by a light splitting device 100, as shown in FIG. 21. The light splitting device 100 is constructed by periodic elements. Here M=3 light sources 1101, 1102, and 1103 are taken as example. When a backlight incidents on, the light splitting device 100 guides light beams modulated by different groups of pixels on the display device 20 to different viewing zones, respectively. The light splitting device 100 and the display device 20 are enlarged alone, as shown in FIG. 22. At time-point t, the parallel backlight incident on the display device 20 is from light source 1101 along a direction direc-1. A one-dimensional lens is taken as the periodic element. Partial pixels of the display device along the x-direction are shown, with labels $p_{l+1}$, $p_{l+2}$, $p_{l+2}$, . . . . Partial periodic elements of the light splitting device 100 along the x-direction are shown, with labels k, k+1, k+2, . . . . The optical centers of the shown periodic elements are denoted by $O_k$, $O_{k+1}$, $O_{k+2}$, . . . . Then according to the one-dimensional grating splitting formula p/e=d/D, the light beam modulated by each pixel of the display device 20 is guided to a corresponding viewing zone. Here, p is the pixel interval along the x-direction, e is the viewing zone interval along the x-direction, d is the distance between pixels and the light splitting device 100, D is the distance between the viewing zones and the light splitting device 100. The light beam modulated by a pixel enters a corresponding periodic element of the light splitting device 100. Concretely, light beam from pixel $p_{l+1}$ enters corresponding periodic element k and is guided to the viewing zones 3; light beam from pixel $p_{l+2}$ enters corresponding periodic element k and is guided to the viewing zones 4; light beam from pixel $p_{l+3}$ enters corresponding periodic element k and is guided to the viewing zones 5; light beam from pixel $p_{l+4}$ enters corresponding periodic element k+1 and is guided to the viewing zones 2; . . . . So, pixel group consisted of pixels . . . , $p_{l+1}$, $p_{l+5}$, . . . corresponds to viewing zone 3, pixel group consisted of . . . , $p_{l+2}$, $p_{l+6}$, $p_{l+10}$, . . . corresponds to viewing zone 4, and so on.

Figure 23:
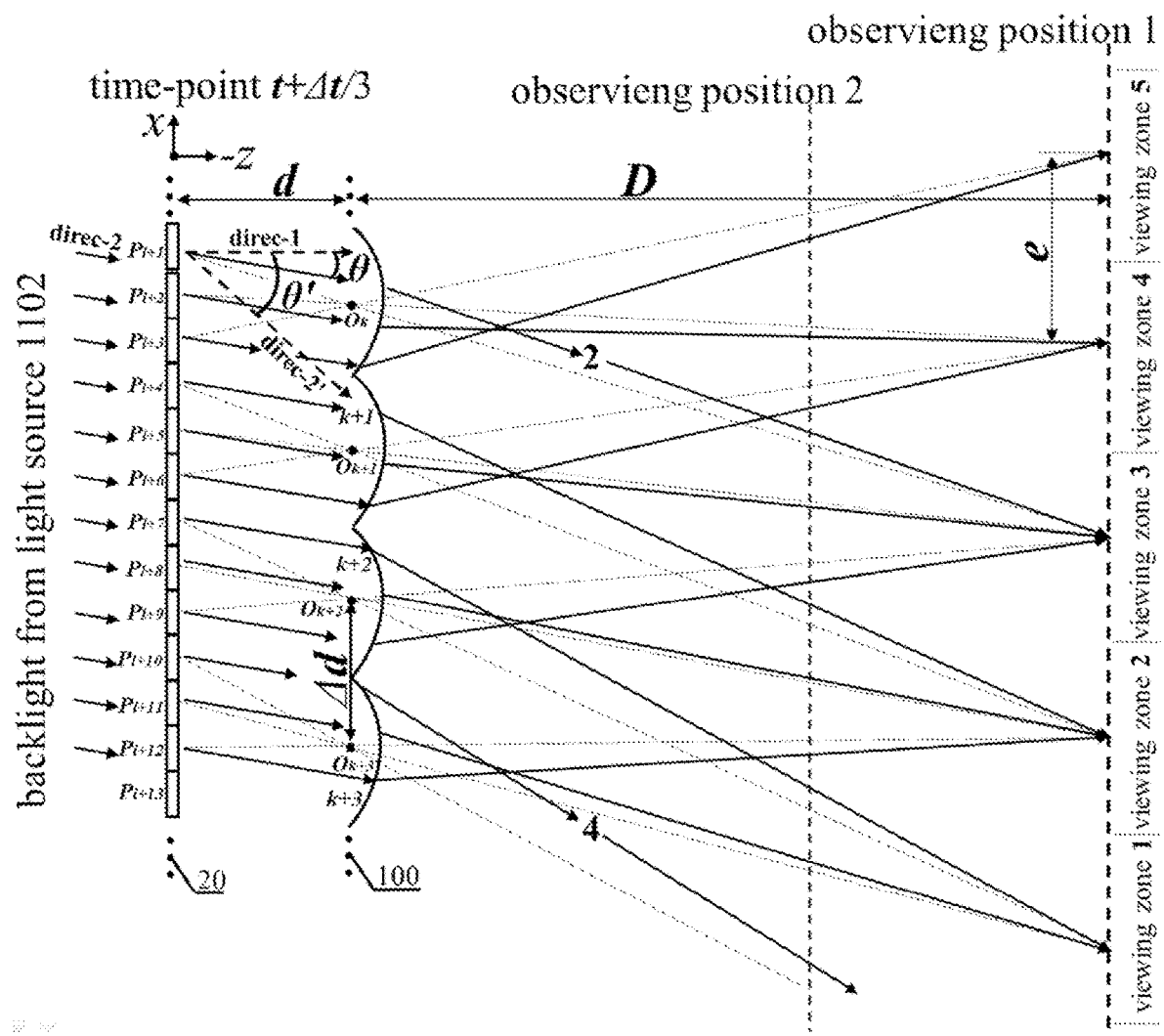
FIG. 23 shows the propagation paths of the light beams from pixels when they pass through the light splitting device at time point $t+\Delta t/3$.

Then, at time-point t+Δt/3, the incident parallel backlight changes to propagate along a direction direc-2, as shown in FIG. 23. Here, for clarity, shown viewing zones are only partial of all the viewing zones. The parallel backlight along the direction direc-2 is from another light source. The direction direc-2 is with a deflection angle of θ to the direction direc-1. Thus, two light beams from a same pixel are guided to a same viewing zone or different viewing zones along different directions. For example, the two light beams modulated by pixel $p_{l+1}$ are guided to the same viewing zone 3 along different directions at two time-points t and t+Δt/3. Differently, the two light beams modulated by pixel $p_{l+7}$ are guided to the viewing zone 5 and the viewing zone 1 at two time-points t and t+Δt/3, respectively. Similar process repeats at other time-points of each time period. In the FIGS. 22 and 23, the pupil 50 can be on the plane containing the viewing zones, also the observing position 1 shown in FIG. 23. The pupil 50 also can be at a position with a distance to the plane containing the viewing zones, such as the observing position 2 shown in the FIG. 23. With increasing of the value of θ, more viewing zones get presented, especially when it is large enough to make a pixel correspond to different periodic elements at different time-points of each time period. The θ' shown in FIG. 23 is a deflection angle large enough to make a pixel correspond to two periodic elements at two time-points t and t+Δt/3, if the backlight is along the direction direc-1 and the direction direc-2' at these two time-points respectively. The direction direc-2' is also shown in the FIGure. Similarly, when the prerequisite of "more than one passing-through light beams for each object point perceived by the pupil 50" is satisfied in each time period, display based on multiple-view-for-one-pupil mechanism gets implemented. When the prerequisite of "one passing-through light beam for each object point perceived by the pupil 50" is satisfied in each time period, display based on Maxwellian view mechanism is expected.

Figure 24:
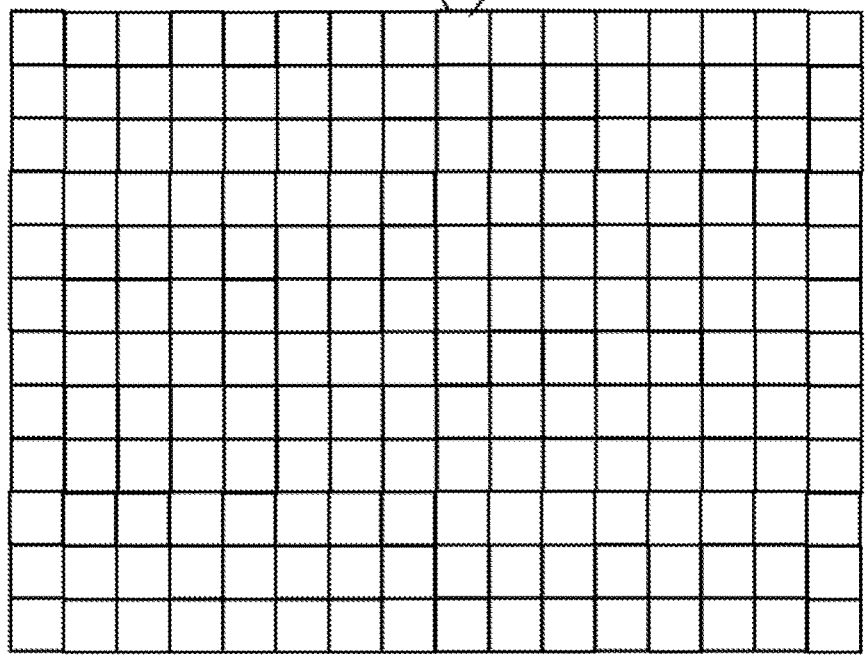
FIG. 24 shows a two-dimensional-structure light splitting device.
Figure 25:
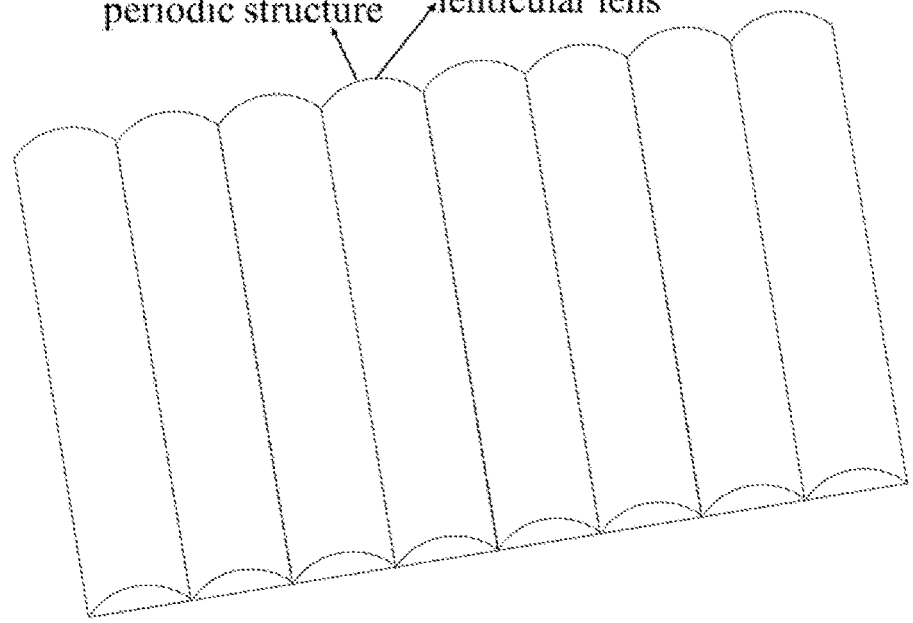
FIG. 25 shows a one-dimensional-structure light splitting device.

FIG. 21 and FIG. 22 explain the display principle along one-dimensional x-direction. This one-dimensional situation can be extended to the two-dimensional situation. There are two cases. For the first case, backlights from the wave-guide backlight unit with time-sequential directional light sources 10 are all two-dimensional parallel light, and the light splitting device 100 takes a two-dimensional structure. The periodic elements of such a two-dimensional-structure light splitting device 100 are arranged along two directions, such as the lens array shown in FIG. 24 which is often used in Integral Image display technology. For the other case, the light splitting device 100 takes a one-dimensional structure, such as parallax barrier or lenticular lens array shown in FIG. 25, or slit grating. The periodic elements of such a one-dimensional-structure light splitting device 100 are strip-shaped. These strip-shaped periodic elements are arranged along a direction. A strip-shaped periodic element is with a long direction being perpendicular to the alignment direction of the strip-shaped periodic elements. For such a one-dimensional-structure light splitting device 100, in the case of the two-dimensional parallel backlight, the light beams from pixels with a displacement larger than the diameter of the pupil 50 along the long direction may miss the pupil 50, or miss the pupil 50 partially. Under this condition, a scattering element 110 attached to the display device 20 is necessary to scatters the light beams from each pixel along the long direction of the strip-shaped periodic elements. Another method is inserting a unidirectional converging device 120 in front of the display device 20, to converge the light beams from all pixels along the long direction of the strip-shaped periodic element. In the FIG. 21, the unidirectional converging device 120 is shown by a dash line, indicating that it can be inserted into the three-dimensional display module as required. The unidirectional converging device 120 can also be inserted behind the display device 20 along the light propagation path. The unidirectional converging device 120 and the scattering element 110 can work together. For one-dimensional-structure light splitting device 100, the backlight from each light source of the wave-guide backlight unit with time-sequential directional light sources 10 can be parallel light only along the alignment direction of the strip-shaped periodic elements, and provides an incident light beam to each pixel with a field angle along the long direction of the strip-shaped periodic elements. The wave-guide backlight unit with time-sequential directional light sources 10 of line-type light sources can project such kind of backlights. The unidirectional converging device 120 or/and the scattering element 110 can work together with the line light source. In FIGS. 22~23, the pixels are shown without overlapping. Actually, adjacent pixels corresponding to a same periodic element of a one-dimensional-structure light splitting device 100 can be arranged in a two-dimensional area of the display device 20, especially when the long direction of the periodic elements is with an inclination angle to the arrangement direction of the pixels. Under this condition, the adjacent pixels which are guided to adjacent viewing zones are often with a displacement along the long direction, and their projections on the x axis of the FIGS. 22~23 are with partial overlapping.

The three-dimensional display module can further insert a projection device 130 between the display device 20 and the viewing zones to project the virtual image of the display device 20.

When enough viewing zones are presented by the three-dimensional display module with a light splitting device 100, the viewing zones can cover two pupils of the viewer, the three-dimensional display module can work as a binocular display system. Especially for a three-dimensional display module with one-dimensional-structure light splitting device 100, when the long direction of the strip-shaped periodic elements is arranged with a small inclination angle to the line connecting two pupils of the viewer, as what the PCT/CN2019/070029 has patented, there is no need of too many viewing zones to cover two eyes of the viewer.

The three-dimensional display module can further contain a pupil positioning unit 90 for determining the spatial position of the pupil 50 real-timely. Then according to the real-time spatial position of the pupil 50, only N≤M light sources whose emitting light beams reach into the pupil 50 are activated at N time-points of each time period, which alleviates the high requirement on the frame rate of the display device 20.

Figure 26:
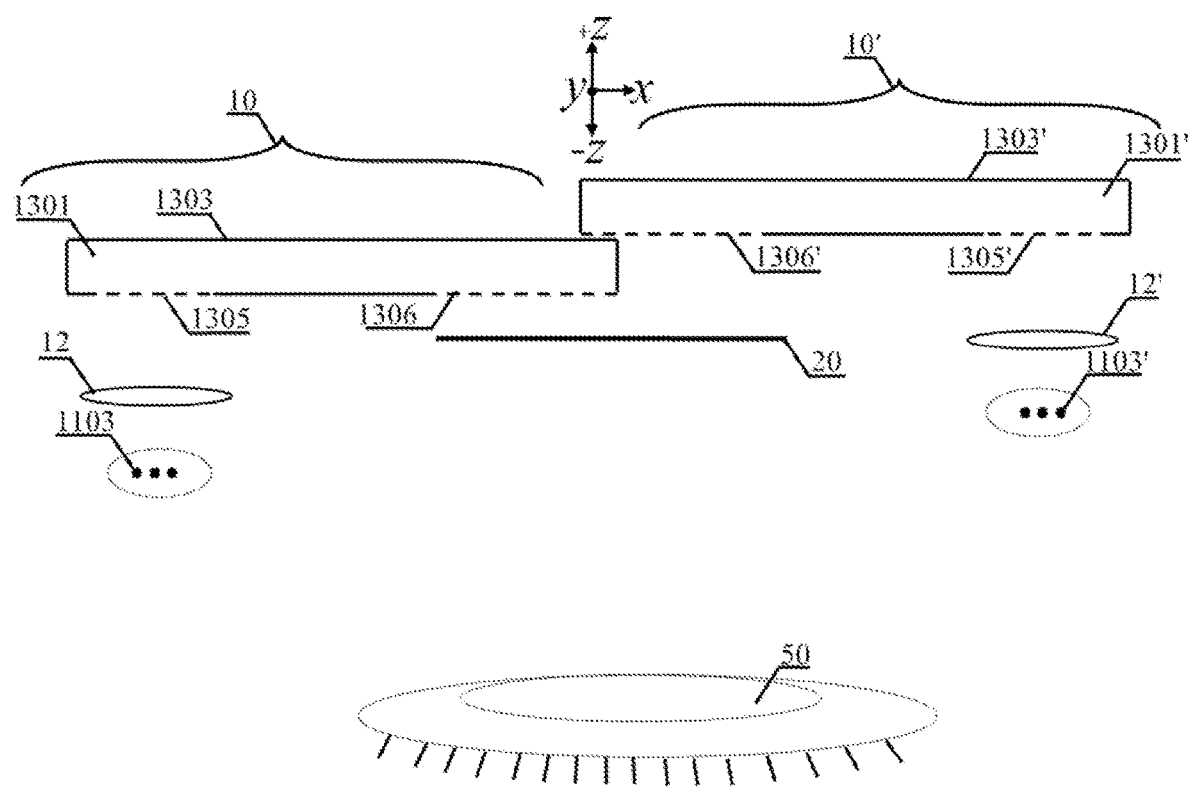
FIG. 26 shows a three-dimensional display module with two wave-guide backlight units.

When the exit pupil 1306 of the adopted optical wave-guide device 13 is not large enough to cover the following optical devices, such as the display device 20, two or more wave-guide backlight unit with time-sequential directional light sources 10 can be designed to provide backlights to different segments of the display device 20. FIG. 26 shows an optical structure with two wave-guide backlight unit with time-sequential directional light sources 10 and 10' for a display device 20.

Figure 27:
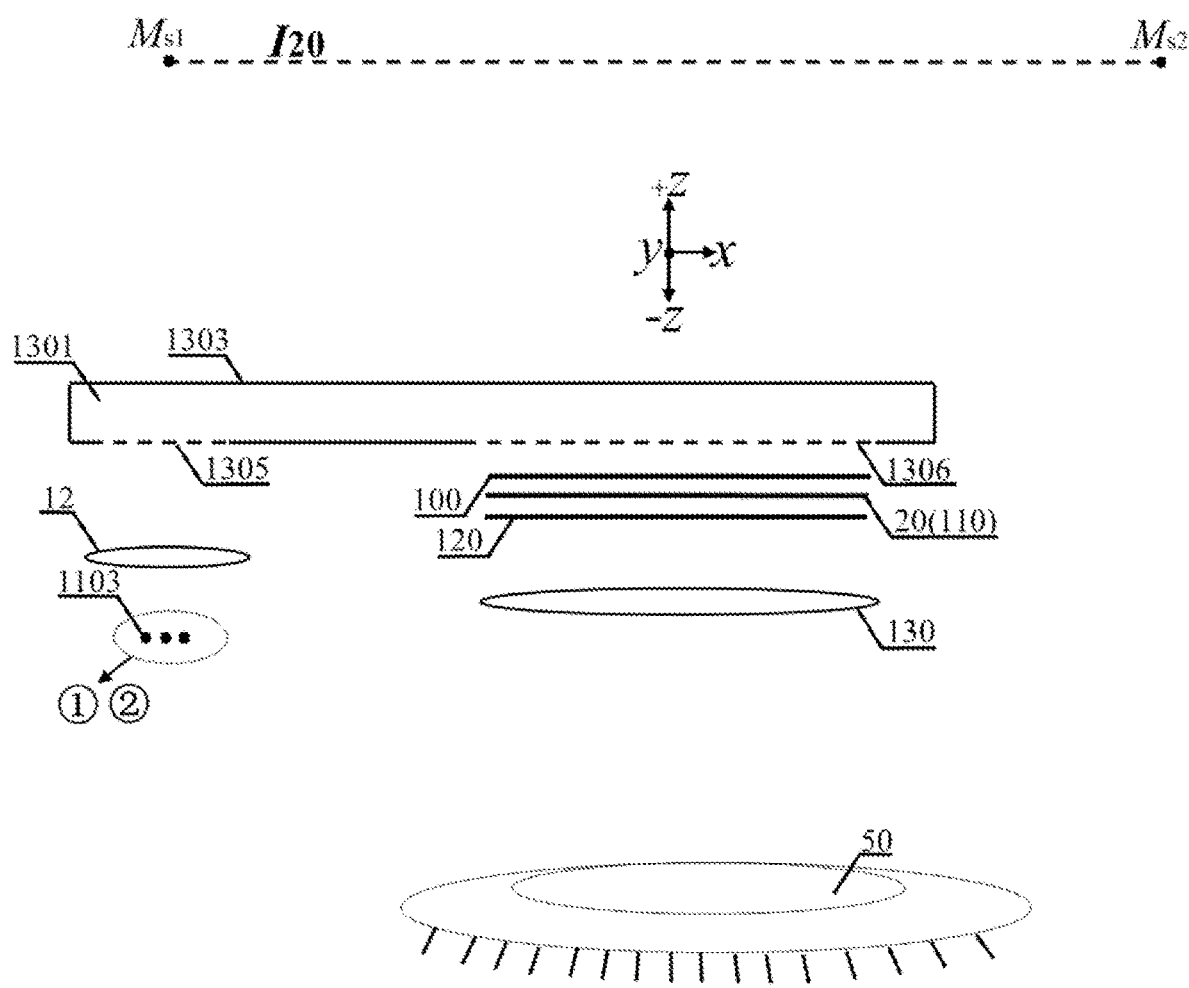
FIG. 27 shows a three-dimensional display module with a light splitting device being placed behind the display device.
Figure 28:
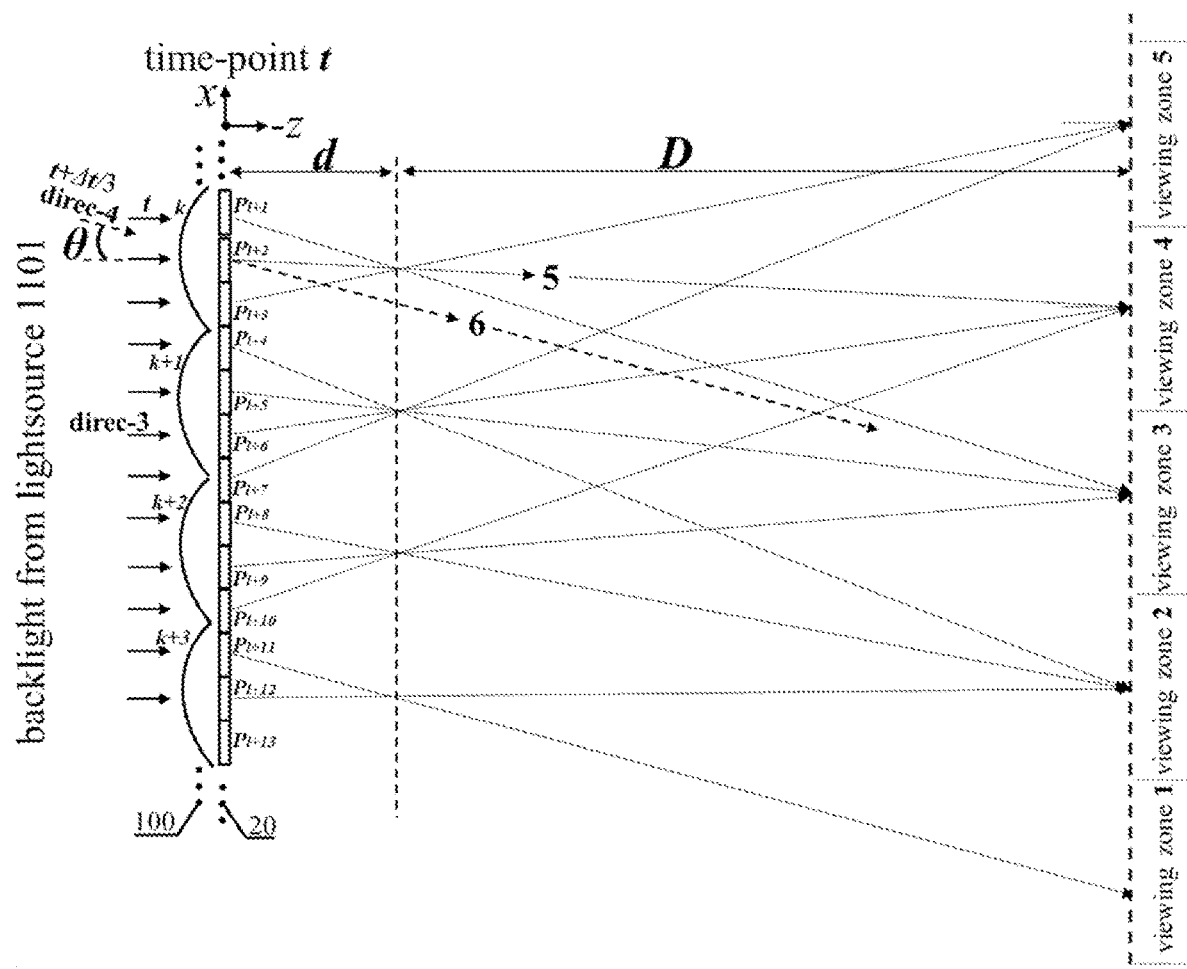
FIG. 28 shows the propagation paths of the light beams passing through the light splitting device to pixels of the display device.

In the FIGS. 21~23, the light splitting device 100 is placed in front of the display device 20 along the light propagation direction. The light splitting device 100 can also be placed behind the display device 20, as shown in FIG. 27. The light splitting device 100 and display device 20 are enlarged alone, as show in FIG. 28. At time-point t, the incident parallel backlight onto the display device 20 is from light source 1101 along a direction direc-3. The incident direction direc-4 at time point t+Δt/M=t+Δt/3 is denoted by dash arrow in the FIG. 28. The direction direc-4 is with an inclination angle θ to the direction direc-3. Then, similar to the analysis about FIGS. 22~23, the three-dimensional display module works. Here, the unidirectional converging device 120 or/and the scattering element 110 can be adopted as needed.

Figure 29:
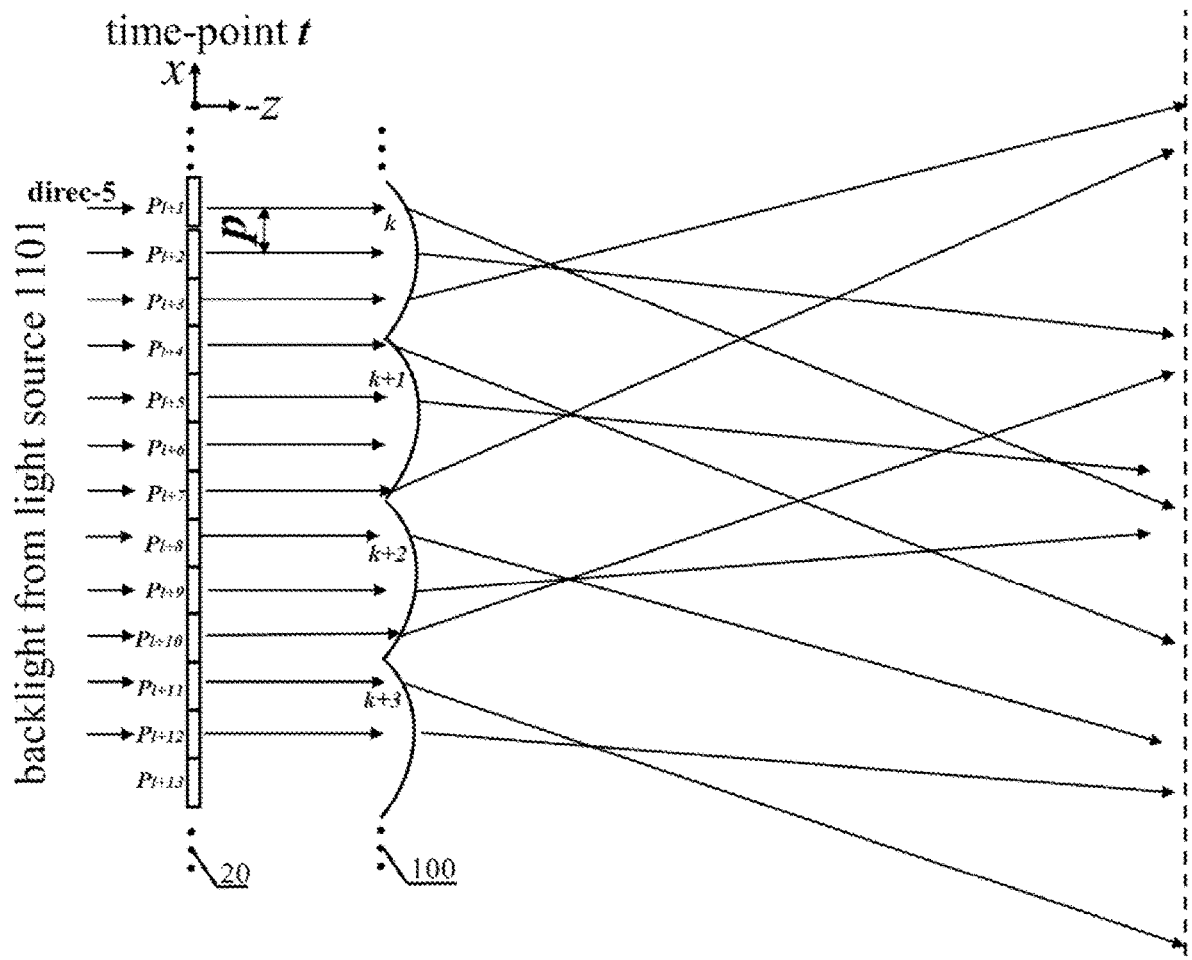
FIG. 29 shows the situation that viewing zones appear without convergent points.

The propagation direction of light beams from pixels are designed based on the grating splitting formula p/e=d/D in above three-dimensional display module with a light splitting device 100. When the display device 20 is placed in front of the light splitting device 100, the corresponding d and D in the formula are also shown in the FIG. 28. When a two-dimensional-structure light splitting device 100 is adopted, the spatial relationship between the display device 20 and the light splitting device 100 will be no longer restricted by the grating splitting formula p/e=d/D. With a two-dimensional parallel backlight along the direction direc-5 shown in FIG. 29, light beam from a pixel propagates along the corresponding direction determined by the phase function of the corresponding periodic element. Under this condition, for each group of pixels that appears in the FIGS. 22~23, the corresponding convergent point can no longer appear, as shown in the FIG. 29. This means that the viewing zone for a group of pixels is a zone without a convergent point, and different viewing zones may overlap with each other. For example, when the periodic elements of the two-dimensional-structure light splitting device 100 are lenses, the three-dimensional display module works as an Integral Image display system when a backlight is projected. When the inclination angle θ is not large enough to make the light beam from a same pixel correspond to different periodic elements at different time-points of a time period, the light beam modulated by each pixel needs to cover partial segment of the corresponding periodic element, not to cover the whole periodic element as what the conventional Integral Image display module does. The inclination angle θ also can be set large enough to make the light beam from a same pixel correspond to different periodic elements at different time-points of a time period.

The size of a pixel and the diffraction effect result in that the light beam from each pixel at a time-point incidents a light spot on the light splitting device 100. This kind light beam may reach into two adjacent periodic elements, with some part reaching into the non-corresponding periodic element as noise. An opaque gap between adjacent periodic elements can suppress this kind of noise when necessary, or turning-off this kind of pixels at corresponding time-point is a feasible method.

The core idea of the present invention is to use an optical wave-guide structure to guide light with corresponding vector characteristics to the display device 20 for obtaining multiple viewing zones. Then through designing the characteristics of the viewing zones, Maxwellian view display or/and multiple-view-for-one-pupil display free from vergence-accommodation conflict can be implemented by guiding one thin light beam or more than one light beams to a pupil.

Above only are preferred embodiments of the present invention, but the design concept of the present invention is not limited to these, and any insubstantial modification made to the present invention using this concept also falls within the protection scope of the present invention. Accordingly, all related embodiments fall within the protection scope of the present invention.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A three-dimensional display module using optical wave-guide for providing directional backlights, comprising:
   a wave-guide backlight unit with time-sequential directional light sources, which comprises a sequential-switching light-source array composed of M light sources, a relay device for modulating a light from each light source, and an optical wave-guide device for guiding lights from the relay device, where M≥2, wherein the wave-guide backlight unit with time-sequential directional light sources is arranged such that the M light sources get turned-on sequentially at the M time-points of each time period, and the light emitted from each light source provides a backlight of corresponding vector characteristics;
   a display device composed of pixels, which takes the lights from the wave-guide backlight unit with time-sequential directional light sources as backlights and each pixel of the display device modulates an incident light beam from the wave-guide backlight unit with time-sequential directional light sources for loading optical image at each time-point;

a wavefront modulation device placed in front of or behind the display device along the propagation directions of the lights from the wave-guide backlight unit with time-sequential directional light sources, which converges the light from each light source to a corresponding viewing zone;

a control device, which sequentially turns on the M light sources at M time-points of each time period with only one light source being turned-on at each time-point, and loads optical information onto each pixel of the display device synchronously, with the loaded optical information of a pixel at a time-point being a projection information of a target scene along a reverse direction of a projection direction corresponding this pixel;

wherein the projection direction corresponding to a pixel at a time-point is a propagation direction of a light beam from this pixel when it enters into the corresponding viewing zone at this time-point, and the three-dimensional display module using optical wave-guide for providing directional backlights is arranged such that totally M different viewing zones get presented.

2. The three-dimensional display module using optical wave-guide for providing directional backlights according to claim 1, wherein the wavefront modulation device is integrated into the optical wave-guide device.

3. The three-dimensional display module using optical wave-guide for providing directional backlights according to claim 1, wherein the optical wave-guide device is comprised of an optical wave-guide body, an entrance pupil, a coupling-in device, reflecting surfaces, a coupling-out device and an exit pupil;

wherein, the light from each light source enters the optical wave-guide body through the relay device and the entrance pupil; then, guided by the coupling-in device and reflected by the reflecting surfaces, the light from each light source propagates in the optical wave-guide body toward the coupling-out device; the coupling-out device guides the light from each light source to exit the optical wave-guide body through the exit pupil with corresponding vector characteristics.

4. The three-dimensional display module using optical wave-guide for providing directional backlights according to claim 1, wherein the M light sources of the wave-guide backlight unit with time-sequential directional light sources are line light sources;

the three-dimensional display module using optical wave-guide for providing directional backlights is arranged such that, for each displayed point, at least two passing-through light beams reach into a pupil positioned around the viewing zones.

5. The three-dimensional display module using optical wave-guide for providing directional backlights according to claim 1, wherein the M light sources of the wave-guide backlight unit with time-sequential directional light sources are point light sources;

the three-dimensional display module using optical wave-guide for providing directional backlights is arranged such that, for each displayed point, at least one passing-through light beam reaches into a pupil positioned around the viewing zones.

6. The three-dimensional display module using optical wave-guide for providing directional backlights according to claim 1, wherein a scattering element is attached to the display device for scattering the light beam modulated by a pixel along a one-dimensional direction;

the three-dimensional display module is arranged such that, for each displayed point, at least two passing-through light beams reach into a pupil positioned around the viewing zones.

7. The three-dimensional display module using optical wave-guide for providing directional backlights according to claim 1, wherein it further comprises a deflection device placed in a propagation path of a light from the wave-guide backlight unit with time-sequential directional light sources for deflecting its propagation direction.

8. The three-dimensional display module using optical wave-guide for providing directional backlights according to claim 1, wherein it further comprises a compensation unit placed between an external environment and the wavefront modulation device, for eliminating the impact of the wavefront modulation device on optical information from the external environment.

9. The three-dimensional display module using optical wave-guide for providing directional backlights according to claim 1, wherein the wavefront modulation device is a lens.

10. The three-dimensional display module using optical wave-guide for providing directional backlights according to claim 1, wherein the wavefront modulation device is a zoom lens with controllable focus;

wherein, the control device is arranged to drive the wavefront modulation device for projecting multiple virtual images of the display device to different depths in a time sequence, and load corresponding information to each pixel of the display device synchronously;

or, according to a viewer's binocular convergence depth detected by an external auxiliary device, the control device is arranged to drive the wavefront modulation device for real-timely projecting the virtual image of the display device to the viewer's binocular convergence depth or a depth near it, and synchronously load corresponding information to each pixel of the display device.

11. The three-dimensional display module using optical wave-guide for providing directional backlights according to claim 10, wherein the wavefront modulation device is a liquid crystal lens with changeable focal length under the driving of the control device, or a compound liquid crystal lens stacked by more than one liquid crystal plates;

wherein, the compound liquid crystal lens presents different focal lengths through the combination of different liquid crystal plates.

12. The three-dimensional display module using optical wave-guide for providing directional backlights according to claim 1, wherein it further comprises a light-path-folding structure inserted in the propagation path of the light from the wave-guide backlight unit with time-sequential directional light sources.

13. The three-dimensional display module using optical wave-guide for providing directional backlights according to claim 12, wherein the light-path-folding structure comprises a first modulation plate, a semi-reflective and semi-transparent plate, a second modulation plate, a selective-reflection/transmission device, wherein the selective-reflection/transmission device reflects a light with one kind of characteristics and transmits a light with another kind of characteristics, which are named as reflection characteristics and transmission characteristics respectively, and the second modulation plate modulates the light of reflection characteristics into the light of transmission characteristics when the light passes through twice;

the light-path-folding structure is arranged such that: propagating through the first modulation plate and the second modulation plate, the incident light with reflection characteristics is reflected by the selective-reflection/transmission device; then the reflected light passes through the second modulation plate once more and is reflected by the semi-reflective and semi-transparent plate; the reflected light from the semi-reflective and semi-transparent plate passes through the second modulation plate thirdly and changes into light of transmission characteristics to exit the selective-reflection/transmission device.

14. The three-dimensional display module using optical wave-guide for providing directional backlights according to claim 1, wherein it further comprises a pupil positioning unit for real-timely determining a spatial position of a pupil or spatial positions of the pupils, then according to the real-time spatial position of the pupil or the real-time spatial positions of the pupils, only N light sources of the M light sources whose emitting light beams reach into the pupil or the pupils are activated at N time-points of each time period for display, where M≥N≥2.

15. A three-dimensional display module using optical wave-guide for providing directional backlights, comprising:
a wave-guide backlight unit with time-sequential directional light sources, which comprises a sequential-switching light-source array composed of M light sources, a relay device for modulating a light from each light source, and an optical wave-guide device for guiding the lights from the relay device, where M≥2, wherein the wave-guide backlight unit with time-sequential directional light sources is arranged such that the M light sources get turned-on sequentially at the M time-points of each time period, and the light emitted from each light source provides a parallel backlight along at least a one-dimensional direction;
a display device composed of pixels, which takes the lights from the wave-guide backlight unit with time-sequential directional light sources as the backlights, and each pixel of the display device modulates an incident light beam for loading optical image at each time-point;
a light splitting device placed in front of or behind the display device, which guides light beams modulated or to be modulated by different groups of pixels on the display device to different viewing zones at each time-point, respectively;
a control device, which sequentially turns on the M light sources at M time-points of each time period with only one light source being turned-on at each time-point, and synchronously loads optical information onto each pixel of the display device, with the loaded optical information of a pixel at a time-point being a projection information of a target scene along a reverse direction of a projection direction corresponding this pixel;
wherein the projection direction corresponding to a pixel at a time-point is the propagation direction of a light beam from this pixel when it enters into the corresponding viewing zone at this time-point, the three-dimensional display module using optical wave-guide for providing directional backlights is arranged such that light beams modulated by a same pixel of the display device propagate along different directions at different time-points of each time period.

16. The three-dimensional display module using optical wave-guide for providing directional backlights according to claim 15, wherein the optical wave-guide device comprises an optical wave-guide body, an entrance pupil, a coupling-in device, reflecting surfaces, a coupling-out device and an exit pupil;
wherein, the light from each light source enters the optical wave-guide body through the relay device and the entrance pupil; then, guided by the coupling-in device and reflected by the reflecting surfaces, the light from each light source propagates in the optical wave-guide body toward the coupling-out device; the coupling-out device guides the light from each light source to exit the optical wave-guide body through the exit pupil with the corresponding vector characteristics.

17. The three-dimensional display module using optical wave-guide for providing directional backlights according to claim 15, wherein the M light sources of a wave-guide backlight unit with time-sequential directional light sources are line light sources;
the three-dimensional display module is arranged such that, for each displayed point, at least two passing-through light beams reach into a pupil positioned around the viewing zones.

18. The three-dimensional display module using optical wave-guide for providing directional backlights according to claim 15, wherein the M light sources of a wave-guide backlight unit with time-sequential directional light sources are point light sources;
the three-dimensional display module is arranged such that, for each displayed point, at least one passing-through light beam reaches into a pupil positioned around the viewing zones.

19. The three-dimensional display module using optical wave-guide for providing directional backlights according to claim 17, wherein a unidirectional converging device is placed in front of or behind the display device to converge the light along a one-dimensional converging direction;
wherein the light splitting device is constructed by strip-shaped periodic elements with the long direction of the strip-shaped elements being consistent with the converging direction of the unidirectional converging device.

20. The three-dimensional display module using optical wave-guide for providing directional backlights according to claim 18, wherein a unidirectional converging device is placed in front of or behind the display device to converge the light along a one-dimensional converging direction;
wherein the light splitting device is constructed by strip-shaped periodic elements with the long direction of the strip-shaped elements being consistent with the converging direction of the unidirectional converging device.

21. The three-dimensional display module using optical wave-guide for providing directional backlights according to claim 15, wherein a scattering element is attached to the display device;
wherein the light splitting device is constructed by strip-shaped periodic elements arranged along one direction, and the scattering element scatters the light beam modulated by the pixel along the long direction of the strip-shaped periodic elements;
the three-dimensional display module is arranged such that, for each displayed point, at least two passing-through light beams reach into a pupil positioned around the viewing zones.

22. The three-dimensional display module using optical wave-guide for providing directional backlights according to claim 15, wherein it further comprises a projection device for projecting the virtual image of the display device.

23. The three-dimensional display module using optical wave-guide for providing directional backlights according to claim 15, wherein it further comprises a pupil positioning unit for real-timely determining a spatial position of a pupil or the spatial positions of the pupils, then according to the real-time spatial position of the pupil or the real-time spatial positions of the pupils, only N light sources of the M light sources whose emitting light beams reach into the pupil or the pupils are activated at N time-points of each time period for the display, where $M \geq N \geq 2$.

24. The three-dimensional display module using optical wave-guide for providing directional backlights according to claim 15, wherein two or more wave-guide backlight unit with time-sequential directional light sources are designed for providing backlights to different segments of the display device.

* * * * *